(12) United States Patent
Constantinou et al.

(10) Patent No.: US 10,493,488 B2
(45) Date of Patent: Dec. 3, 2019

(54) METHODS AND FORMULATIONS FOR DURABLE SUPERHYDROPHIC, SELF-CLEANING, AND SUPERHYDROPHOBIC POLYMER COATINGS AND OBJECTS HAVING COATINGS THEREON

(71) Applicant: UNIVERSITY OF MASSACHUSETTS, Boston, MA (US)

(72) Inventors: Jason Constantinou, Beaverton, OR (US); Hanna Dodiuk-Kenig, Haifa (IL); Carol M. F. Barry, Tyngsborough, MA (US); Samuel Kenig, Haifa (IL); Joey L. Mead, Carlisle, MA (US); Artee Panwar, Wilmington, MA (US); Tehila Nahum, Holon (IL); Sagar Mitra, Lowell, MA (US)

(73) Assignee: The University of Masachusetts, Boston, MA (US)

( * ) Notice: Subject to any disclaimer, the term of this patent is extended or adjusted under 35 U.S.C. 154(b) by 336 days.

(21) Appl. No.: 15/304,242

(22) PCT Filed: Apr. 17, 2015

(86) PCT No.: PCT/US2015/026442
§ 371 (c)(1),
(2) Date: Oct. 14, 2016

(87) PCT Pub. No.: WO2015/161233
PCT Pub. Date: Oct. 22, 2015

(65) Prior Publication Data
US 2017/0036241 A1    Feb. 9, 2017

Related U.S. Application Data

(60) Provisional application No. 62/079,632, filed on Nov. 14, 2014, provisional application No. 62/145,054, (Continued)

(51) Int. Cl.
*B05D 5/08* (2006.01)
*B05D 5/00* (2006.01)
(Continued)

(52) U.S. Cl.
CPC ............. *B05D 5/08* (2013.01); *B05D 3/0254* (2013.01); *B05D 3/067* (2013.01); *B05D 5/00* (2013.01);
(Continued)

(58) Field of Classification Search
None
See application file for complete search history.

(56) References Cited

U.S. PATENT DOCUMENTS

| 4,043,969 A * | 8/1977 | Sporck | C08G 59/18 |
| | | | 257/E23.117 |
| 2010/0109203 A1* | 5/2010 | Chen | B29C 33/40 |
| | | | 264/446 |

(Continued)

FOREIGN PATENT DOCUMENTS

| DE | 102012208653 A1 | 11/2012 | |
| WO | 22012170832 A1 | 12/2012 | |
| WO | WO-2012170832 A1 * | 12/2012 | ........... C09D 5/1662 |

OTHER PUBLICATIONS

Lee et al.; Fabrication of Hydrophobic Films Replicated from Plant Leaves in Nature; Surface & Coatings Technology; 201 (2006) 553-559.*

(Continued)

*Primary Examiner* — Michael P. Rodriguez
(74) *Attorney, Agent, or Firm* — Burns & Levinson LLP; Orlando Lopez

(57) ABSTRACT

An object has a durable superhydrophic, self-cleaning, and icephobic coating includes a substrate and a layer disposed on the substrate, the layer resulting from coating with a formulation having an effective amount of hierarchical structuring micro/nanoparticles, liquid silane having one or more groups configured to graft to a hierarchical structuring micro/nanoparticle and at least another group that results in hydrophobicity. The hierarchical structuring micro/nanoparticles are dispersed in the liquid silane. Another effective amount of synthetic adhesive, selected from thermosetting binders, moisture curing adhesives or polymers that form a strong interaction with a surface, is in solution with a solvent. Upon curing, the layer has a contact angle greater than 90° and a sliding angle of less than 10° and, less than 5% of an area of the layer is removed in a Tape test.

25 Claims, 13 Drawing Sheets

Related U.S. Application Data filed on Apr. 9, 2015, provisional application No. 61/981,426, filed on Apr. 18, 2014.

(51) Int. Cl.
| | | |
|---|---|---|
| *C09D 5/00* | (2006.01) | |
| *B05D 3/02* | (2006.01) | |
| *B05D 3/06* | (2006.01) | |
| *B29C 59/02* | (2006.01) | |
| *C25D 1/10* | (2006.01) | |
| *C25D 1/20* | (2006.01) | |
| *C09D 7/40* | (2018.01) | |
| *C08K 3/36* | (2006.01) | |

(52) U.S. Cl.
CPC .......... *B05D 5/083* (2013.01); *B29C 59/022* (2013.01); *C09D 5/00* (2013.01); *C09D 7/69* (2018.01); *C25D 1/10* (2013.01); *C25D 1/20* (2013.01); *B05D 2601/22* (2013.01); *B29K 2827/18* (2013.01); *B29K 2863/00* (2013.01); *C08K 3/36* (2013.01)

(56) References Cited

U.S. PATENT DOCUMENTS

2012/0126458 A1* 5/2012 King ................ B22C 9/00
264/483
2013/0075632 A1* 3/2013 Cho ................ H05K 9/009
250/515.1

OTHER PUBLICATIONS

Lee et al.; Mass-Producible Replication of Highly Hydrophobic Surfaces from Plant Leaves; Nanotechnology; 17 (2006) 3189-3196.*
Supplementary European Search Report and Search Opinion for European Patent Application No. 15779807.5.

* cited by examiner

METHODS AND FORMULATIONS FOR DURABLE SUPERHYDROPHIC, SELF-CLEANING, AND SUPERHYDROPHOBIC POLYMER COATINGS AND OBJECTS HAVING COATINGS THEREON

CROSS-REFERENCE TO RELATED APPLICATIONS

This application is a U.S. national stage application under 35 U.S.C. 371 of co-pending International Application No. PCT/US 15/26442, filed on Apr. 17, 2015, entitled METHODS AND FORMULATIONS FOR DURABLE SUPERHYDROPHIC, SELF-CLEANING, AND SUPERHYDROPHOBIC POLYMER COATINGS AND OBJECTS HAVING COATINGS THEREON, which in turn claims priority to U.S. Provisional Patent Application No. 61/981,426, filed on Apr. 18, 2014, U.S. Provisional Patent Application No. 62/079,632, filed on Nov. 14, 2014, and U.S. Provisional Patent Application No. 62/145,054, filed on Apr. 9, 2015, the contents of which are incorporated by reference herein in their entirety for all purposes.

STATEMENT REGARDING FEDERALLY SPONSORED RESEARCH OR DEVELOPMENT

This invention was made partially with U.S. Government support from the National Science Foundation under the Nanoscale Science and Engineering Centers program (Award: NSF-0832754). The U.S. Government has certain rights in the invention.

BACKGROUND

This invention relates generally to superhydrophic, self-cleaning, and icephobic polymer coatings, and, more particularly, to durable superhydrophic, self-cleaning, and icephobic polymer coatings.

The surface build up of ice, or ice accretion, and ice adhesion to various surfaces, have been a consistently undesirable occurrence on infrastructure in high altitude and cold regions. The infrastructure affected by ice includes, but is not limited to, wind turbines, power lines, aircrafts, naval vehicles, and buildings. Associated costs with ice accretion and ice adhesion include ice removal, inefficient operation, aerodynamic instabilities, and safety hazards. Current methods of ice removal are characteristically separated by active and passive means. Active methods typically involve the input of mechanical and thermal energy to break or melt ice, as well as the application of sacrificial low surface energy waxes, which all require active involvement of a trained workforce using costly tools and environmentally-unfriendly chemicals. Traditional passive methods include low surface energy coatings, but these surfaces are easily fouled, require maintenance, and tend to be semi-sacrificial. Establishing a surface treatment that required low to no maintenance that reduced the accretion of ice would result in both economical and ecological savings.

Ice accretion, and its adhesion strength, is related to many factors tied to the source of water, as well as the energy of the surface and the droplet. Atmospheric icing, an issue of great importance to aerospace applications, is extremely difficult to resolve. Resulting from their high purity, water droplets in clouds can be found as super-cooled liquid with temperatures reaching as low as −40° C. Upon the high velocity impact to an airplane, the super-cooled water instantly begins ice nucleation, and the surface of the airplane is fouled.

At lower elevations, ground precipitation becomes a problem. Snow, rain, ice pellets, freezing rain, and the combinatory precipitation of the previously listed foul the surfaces of ground infrastructure. Though not as extreme as the high velocity impact of super-cooled liquid with atmospheric icing on planes, ground precipitation becomes more of an issue due to the scale of the problem. Lastly, the formation of ice by condensation of ambient moisture as frost must be addressed. Although the ice layer associated with frost is typically thinner than the accretion developed through the previously listed sources, frost has greater adhesion to the surface due to its deposition throughout the recesses of a surface.

Partially listed above, the factors that affect ice adhesion are numerous and are related to a combination of the environment and the surface characteristics. Beginning with environmental factors, the ambient temperature and humidity have been shown to affect ice adhesion. Impact velocity, droplet size, and wind speed were shown to affect ice adhesion through the droplet kinetics. Relating to both the drop and the environment, the ice nucleation and freezing rate were found to affect ice adhesion. Finally, as mentioned before, the type of icing has serious affects on the strength of ice on a surface.

Moving to the surface characteristics, which are the focus of this work, and the use of superhydrophobic surfaces for anti ice accretion, the hydrophilicity or hydrophobicity of a surface affects ice adhesion. This attraction, related to the surface energy of the surface, typically has been characterized through contact angle measurement, with a contact angle below 90° being hydrophilic, and a contact angle larger than 90° being hydrophobic.

Superhydrophobic surfaces represent one approach, exhibiting a surface's ability to shed water droplets due to a static contact angle greater than 150° and a low contact angle hysteresis. This effect is named after the lotus leaf, which exhibits this behavior due to a low surface energy wax, as well as a hierarchal roughness of nanometer and micrometer asperities. Many research groups have fabricated surfaces similar to the lotus leaf in order to reproduce the water shedding effect, with comparable performance.

In order to fabricate the superhydrophobic surface, a variety of techniques have been used through the literature. These techniques include top-down subtractive methods: optical lithography, e-beam lithography, soft lithography, nanoimprint lithography, block copolymer lithography, scanning probe lithography, and plasma etching, as well as bottom-up additive methods: sol-gel nanofabrication, molecular self-assembly, vapor phase deposition, embedded nanoparticles of silica in epoxy mixture, carbon nanotubes in thermoplastic, cast silica/POSS in fluoroalkylsilane, and silanized calcium carbonate in polyacrylate. No matter which techniques or base substrates were employed, each method included micro/nanometer features for roughness and a low surface energy coating.

Although many research groups have worked on the creation of superhydrophobic surfaces, the focus of their use against ice accretion has been studied by just a few. Tourkine and his group, compared the effect of superhydrophobicity on the freezing of static water droplets compared to hydrophilic surfaces By comparing a fluorinated thiol treated microstructured copper substrate versus a smooth copper substrate, a delay in freezing time was observed when using a superhydrophobic surface. The argued reasoning for this freeze delay was the presence of an air film between the droplet and the superhydrophobic surface, providing insulation to the droplet. Coupled with the self-cleaning properties of superhydrophobic surfaces, the probability increases for the water droplet to be shed prior to adhering to the surface. In 2010, Yin et al. showed surface wetting for surfaces, from superhydrophilic to superhydrophobic, were temperature-dependent. As the ambient testing temperature was reduced from 40° to −10° C., greater wettability change was shown on the superhydrophobic surface on a horizontal surface. Although there was greater change associated with superhydrophobic surfaces, the paper also looked at varying inclination angle during ice accretion. Because the superhydrophobic surface was able to shed the super-cooled water spray, the amount of ice accretion was significantly decreased with increased inclination angle and hydrophobicity. In Antonini et al., a superhydrophobic etched aluminum surface coated with Teflon was found to reduce the amount of run-back ice as compared to the untreated aluminum surface and a hydrophobic PMMA coated aluminum surface, designed to replicate the airfoil of an airplane wing. Although the superhydrophobic surface did develop an ice layer, it showed a reduction in energy required to remove ice accretion. The reasoning for the reduced run-back ice was again linked to the ability of the surface to shed water droplets, as well as a reduced wetting trail of the droplet on the surface during roll-off. Alizadeh et al. discovered a delay in ice nucleation when comparing superhydrophobic surfaces versus superhydrophilic, hydrophilic, and hydrophobic surfaces. Using a dynamic droplet, and high-speed photography, superhydrophobic surfaces were found to have dual means of increasing the time of ice nucleation—they affirmed the reduced heat transfer by means of an air barrier below the droplet that Tourkine noted, as well as suggesting a reduced nucleation initiation between the droplet and the surface due to an increase in nucleation activation energy to form a nucleating site. Additionally, the superhydrophobic surface provided a more elastic response of the droplet upon impact as compared to the other surfaces.

Mishchenko et al. showed that the adhesion strength of ice on the surface of a superhydrophobic surface resulting for static freezing was much less than that of the compared surfaces. Further, the retraction of the droplet upon impact of a superhydrophobic surface was shown to provide an additional means of removal prior to ice nucleation. In the study a variety of superhydrophobic surfaces were made using nanostructured silicon arrays, treated with a hydrophobic silane. The nanostructures were selected to see the dynamic pressure stability of the different structures and their effect on impacted droplet retraction. Closed cell structures were found to have better pressure stability, and a reduction in energy loss during droplet retraction. Kulinich and coworkers showed in 2009 that the strength of ice adhesion was less linked to the static contact angle, and was more of a function of the contact angle hysteresis. By using a centrifugal ice shear strength test, the ice adhesion was measured to see its comparison to both contact angle and contact angle hysteresis.

While much has been reported on the use of superhydrophobic surfaces for anti ice accretion, several research groups suggest against the use of superhydrophobic surfaces due to their inherent roughness; an essential characteristic of superhydrophobic surfaces since the highest contact angle that would result from a smooth surface is on the order of 1200.

Previously mentioned is the ability for superhydrophobic surfaces to support water droplets from impinging the surface, typically described as being in the Cassie-Baxter state; however, with sufficient energy, the water droplet may be impaled by the surface asperities. This state is typically described as the Wenzel state. Once the droplet is impaled onto a surface, either by the kinetics of the droplet or the asperity pitch of the surface features increasing too much to support the Laplace pressure of the static droplet, the ice formed would again be strengthened by the increase in contacted surface area.

A further issue related to the features of superhydrophobic roughness is the cycling of icing and deicing. Kulinich showed that the repeated process of a passive anti-icing surface lost its effectiveness after each cycle, questioning the durability of these features. Due to the high aspect ratio of the features, the brittle cleaving of the features changes the characteristics of the surface.

Although there exists several hurdles with the use of superhydrophobic surfaces for use in passive anti ice accretion applications, including but not limited to: cyclic fracture of surface features and the increased adhesion due to contacted surface area from the transition between the Cassie-Baxter and Wenzel states and frost formation, the use of superhydrophobic surfaces should not be ruled out as a possible solution to anti icing.

The route to obtaining the superhydrophobicity is through the combination of the surface geometry and chemical functionalization of the silane. Prior work has demonstrated the potential for preparation of superhydrophic surfaces from combinations of silica, silanes, and POSS'. Rios et al (Transparent Ultra-hydrophobic Coating) showed a contact and sliding angle of above 165° and less than 1° could be achieved with two coating solutions. The coatings were composed of hydrophilic fumed silica (Aerosil 200) and fluoro-functionalized polyhedral oligomeric silsesquioxane (FPOSS). The concentration ratios of Aerosil 200 and FPOSS in the two solutions were 1% wt. to 3% wt. and 0.5% wt. to 1.5% wt., respectively. Rios et al. previously tested multiple ultra-hydrophobic coatings for durability under multiple conditions. Many aspects of durability were tested including QUV stability, water immersion, isopropyl alcohol (IPA) immersion, and paper rubbing. One of the best performing coatings was the UH2 comprised of hydrophobic dimethyl-silicone treated fumed silica (Cab-O-Sil TS720) and Dynasylan F 8263. The coatings, while demonstrating good icephobic characteristics, were not durable and were easily removed. Thus, there exists a need for a durable and low maintenance coating providing icephobic characteristics.

BRIEF SUMMARY

Formulations used in durable and low maintenance coatings providing icephobic and superhydrophobic, self-cleaning characteristics, objects having coatings resulting from the formulations and methods for obtaining those coatings are disclosed herein below.

In one or more embodiments, an object having a durable superhydrophic, self-cleaning, and icephobic coating of these teachings includes a substrate and a layer disposed on the substrate, the layer resulting from coating with a formulation having an effective amount of hierarchical structuring micro/nanoparticles, liquid silane having one or more groups configured to graft to a hierarchical structuring micro/nanoparticle and at least another group that results in hydrophobicity, the hierarchical structuring micro/nanoparticles being dispersed in the liquid silane and another effective amount of synthetic adhesive selected from thermosetting binders including adhesives, moisture curing adhesives or polymers that form a strong interaction with a surface; the synthetic adhesive being in solution with a solvent, the synthetic adhesive being in solution with a solvent, wherein, upon curing, the layer has a contact angle greater than 150° and a sliding angle of less than 10° and, less than 18% of an area of the layer and preferably less than 5%, s removed in a Tape test.

In one or more embodiments, the superhydrophobic coating formulation of these teachings includes an effective amount of hierarchical structuring micro/nanoparticles, liquid silane having one or more groups configured to graft to a hierarchical structuring micro/nanoparticle and at least another group that results in hydrophobicity, the hierarchical structuring micro/nanoparticles being dispersed in the liquid silane, and another effective amount of synthetic adhesive selected from thermosetting binders, moisture curing adhesives or polymers that form a strong interaction with a surface; the synthetic adhesive being in solution with a solvent, wherein, upon mixing the effective amount of hierarchical structuring micro/nanoparticles suspended in the liquid silane with said another effective amount of synthetic adhesive dissolved in the solvent and coating on a substrate and curing, a layer that has a contact angle greater than 150° and a sliding angle of less than 10°, less than 18% of an area of the layer and preferably less than 5% of an area of the layer, is removed in a Tape test is obtained.

In one or more embodiments, the method of these teachings for obtaining a superhydrophobic durable coating includes forming a first solution by suspending an effective amount of hierarchical structuring micro/nanoparticles in liquid silane; the liquid silane having one or more groups configured to graft to a hierarchical structuring micro/nanoparticle and at least another group that results in hydrophobicity, stirring the first solution for a first predetermined time, the first predetermined time selected such that the hierarchical structuring micro/nanoparticles react with the liquid silane, forming a second solution by dissolving another effective amount of synthetic adhesive in a solvent; the synthetic adhesive being selected from thermosetting binders (binders are used herein includes adhesives), moisture curing adhesives, radiation curing adhesives or polymers that form a strong interaction with a surface, mixing the first solution with the second solution in predetermined proportions; resulting in a third solution, coating a substrate with the third solution, allowing evaporation of excess solvent in the third solution coated on the substrate, and curing the third solution coated on the substrate by heating for a second predetermined time at a predetermined temperature or at exposed to a predetermined radiation for a third predetermined time.

In one or more embodiments, the method of these teachings for forming super hydrophobic surfaces in polymer structures includes: forming a super hydrophobic layer on a substrate by: forming a first solution by suspending an effective amount of hierarchical structuring micro/nanoparticles in liquid silane; the liquid silane having one or more groups configured to graft to a hierarchical structuring micro/nanoparticle and at least another group that results in hydrophobicity; stirring the first solution for a first predetermined time, the first predetermined time selected such that the hierarchical structuring micro/nanoparticles react with the liquid silane; forming a second solution by dissolving another effective amount of synthetic adhesive in a solvent; the synthetic adhesive being selected from thermosetting binders, anionic curing adhesives, cationic curing adhesives, free radical (including radiation curing) curing adhesives or polymers that form a strong interaction with a surface; mixing the first solution with the second solution in predetermined proportions; resulting in a third solution; coating a substrate with the third solution; and allowing evaporation of excess solvent in the third solution coated on the substrate; and curing the third solution coated on the substrate by heating for a second predetermined time at a predetermined temperature (including at room temperature for 2-3 hrs—in case of cyanoacrylate adhesive); coating the super hydrophobic layer with the first thermosetting polymer solution; curing the first thermosetting polymer solution resulting in a first cured thermosetting polymer; peeling the first cured thermosetting polymer, resulting in a first cured thermosetting polymer layer; using the first cured thermosetting polymer layer as a master for forming super hydrophobic surfaces in polymer structures.

Other embodiments are also disclosed.

For a better understanding of the present teachings, together with other and further objects thereof, reference is made to the accompanying drawings and detailed description and its scope will be pointed out in the appended claims.

DETAILED DESCRIPTION

Figure 1:
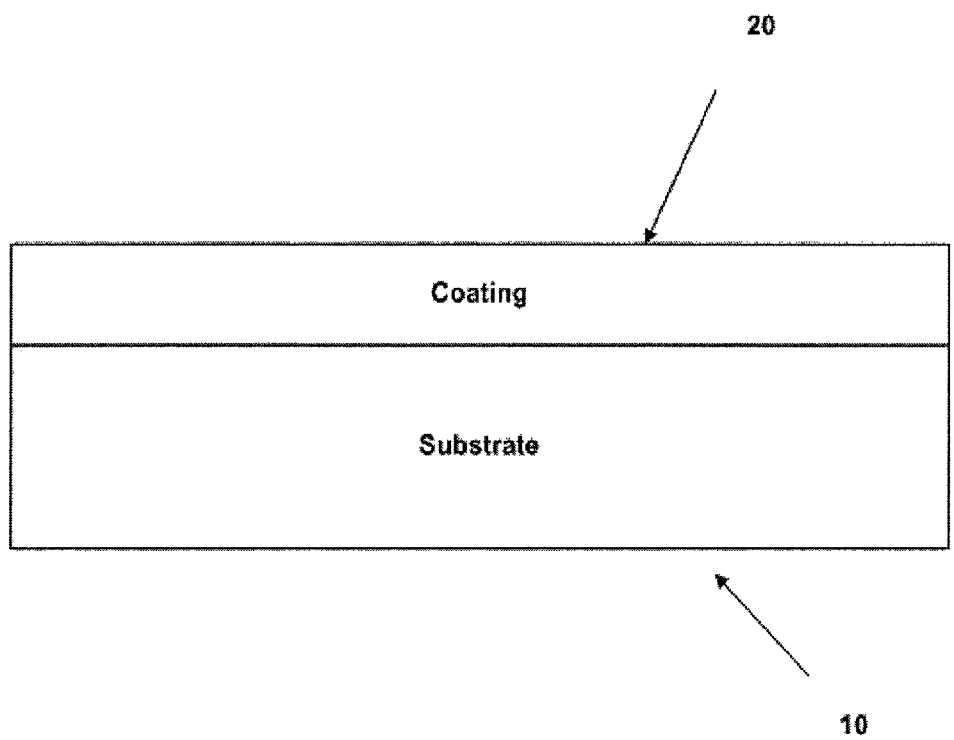
FIG. 1 is a graphical schematic representation of one embodiment of an object having a superhydrophobic, self-cleaning, and icephobic coating of these teachings.
Figure 1A:
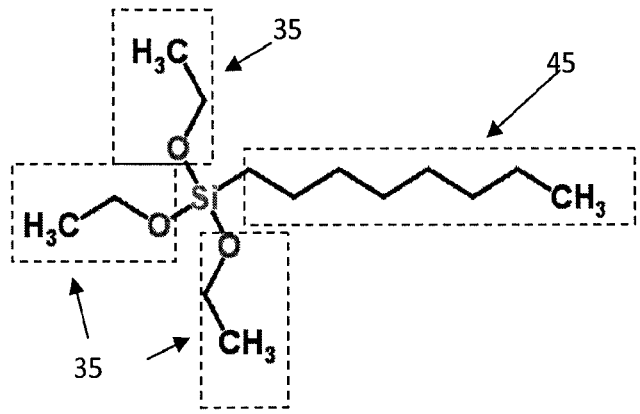
FIGS. 1a-1d show exemplary embodiments of silanes as used in these teachings.
Figure 1B:
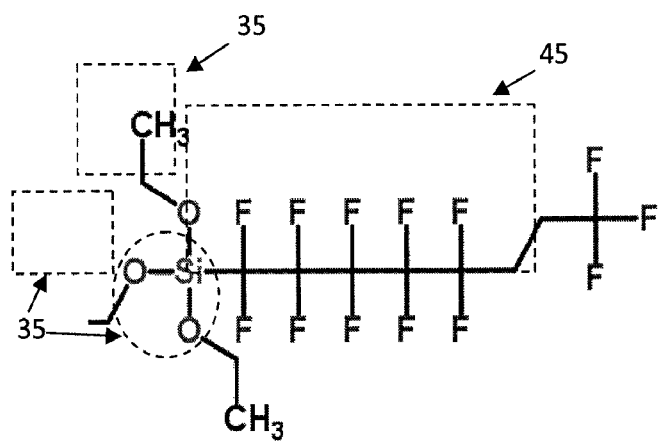
Figure 1C:
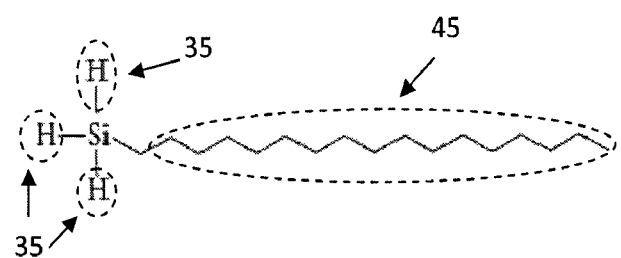
Figure 1D:
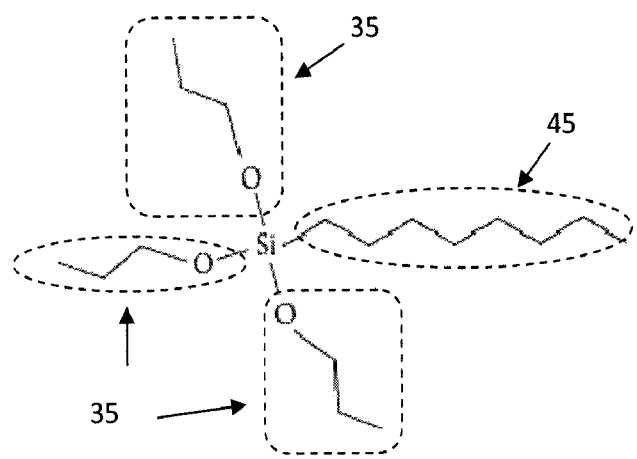

The following detailed description presents the currently contemplated modes of carrying out these teachings. The description is not to be taken in a limiting sense, but is made merely for the purpose of illustrating the general principles of these teachings.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

In order to elucidate the present teachings, the following definitions are provided.

The "contact angle," as used herein, is the angle where a liquid/vapor interface meets a solid surface.

The "sliding angle," as used herein, is the angle between the sample surface and the horizontal plane at which the liquid drop starts to slide off the sample surface under gravity influence.

A "Tape Test," as used herein, is a test using pressure sensitive tape to determine the adhesion quality of materials (see, for example, IPC-TM-650 for materials used in Printed Boards or ASTM D3359).

"Liquid silane," as used herein, refers to silane in solution with a solvent, for example, but not limited to, isopropyl alcohol.

"Synthetic adhesives/binders," as used herein, are adhesives based on elastomers, thermoplastics, emulsions, and thermosets and include polymers that form a strong interaction with the surface such as, but not limited to, thermosetting binders, anionic curing adhesives, cationic curing adhesives, free radical curing adhesives, a thermoplastic polyurethane elastomer, and radiation curable polymers. Exemplary embodiments of synthetic adhesive are cyanoacrylate, acrylic polymers, thermoplastic polyurethane elastomers and radiation curable polymers.

Formulations used in durable and low maintenance coatings providing icephobic and superhydrophobic, self-cleaning characteristics, objects having coatings resulting from the formulations and methods for obtaining those coatings are disclosed herein below.

In one or more embodiments, the superhydrophobic coating formulation of these teachings includes an effective amount of hierarchical structuring micro/nanoparticles, liquid silane having one or more groups and at least another group that results in hydrophobicity, the hierarchical structuring micro/nanoparticles being dispersed in the liquid silane, and another effective amount of synthetic adhesive selected from thermosetting binders (including adhesives), anionic curing adhesives, cationic curing adhesives, free radical curing (including radiation curing) adhesives or polymers that form a strong interaction with a surface; the synthetic adhesive being in solution with a solvent, wherein, upon mixing the effective amount of hierarchical structuring micro/nanoparticles suspended in the liquid silane with said another effective amount of synthetic adhesive dissolved in the solvent and coating on a substrate and curing, a layer that has a contact angle greater than 90° (a layer that has a contact angle greater than 150° would be super hydrophobic and preferable) a sliding angle of less than 10°, less than 18% of an area of the layer and preferably less than 5% of an area of the layer, is removed in a Tape test is obtained. (The relative adhesion strength is quantified by the light transmission through the tape before and after the test. The light transmission can be correlated to the amount of area of the layer that is removed in the Tape test. See, for example, G. V. Calder, F. C. Hansen, A. Parra, Quantifying the Tape Adhesion Test, in Adhesion Aspects of Polymeric Coatings, 1983, Springer Verlag, pp 569-582, which is incorporated by reference herein in its entirety and for all purposes. In other embodiments, the relative adhesion strength is examined by contact angle measurement before and after tape test.)

In one instance, the liquid silane includes a fluoroalkylsilane or an alkylsilane. In one embodiment, the fluoroalkyl silane is tridecafluorooctyl-triethoxy silane. Exemplary embodiments of silanes as used in the present teachings are shown in FIGS. 1a-1d. Referring to FIGS. 1a-1d, each silane has one or more groups 35 configured to graft to a hierarchical structuring micro/nanoparticle and at least another group 45 that results in hydrophobicity. (See, for example, these teachings not being limited only to that example, Damian Ambrotewicz, Filip Ciesielczyk, Magdalena Nowacka, et al., "Fluoroalkylsilane versus Alkylsilane as Hydrophobic Agents for Silica and Silicates," Journal of Nanomaterials, vol. 2013, Article ID 631938, 13 pages, 2013. doi:10.1155/2013/631938, which is incorporated by reference herein in its entirety and for all purposes.) In one instance, one or more groups configured to graft to a microstructuring microparticle are one or more tri-ethoxy groups.

In one instance, the synthetic adhesive is cyanoacrylate. In one embodiment, the cyanoacrylate is ethyl 2-cyanoacrylate. Other possible cyanoacrylates include, but are not limited to, methyl 2-cyanoacrylate, n-butyl cyanoacrylate and 2-octyl cyanoacrylate. In one instance, the solvent used with the synthetic adhesive is acetone. Solvents can also include, but are not limited to, nitromethane, diethyl ether, hexane, dimethyl sulfoxide, methylene chloride and chloroform. Other instances of the synthetic adhesive include acrylic polymers, thermoplastic polyurethane elastomers and radiation curable polymers.

In one instance, the hierarchical structuring micro/nanoparticles are silica microparticles. In one embodiment, the silica micro/nanoparticles are hydrophobic fumed silica nanoparticles. The silica micro/nanoparticles can also include a precipitated silica, unprecipitated silica, hydrophilic fumed silica, colloidal silica or treated colloidal silica. In one embodiment, the silica micro/nanoparticles are surface modified with silicone. In one instance the silicone is polydimethylsiloxane. The silica micro/nanoparticles act as micro/nano-structuring agents. Other embodiments of micro/nano-structuring agents including, but not limited to, micro/nanoparticles that are surface modified with silicone where, for example, the micro/nanoparticles include treated colloidal silica, silicate, treated silicate, PTFE micropowder, metal nanopowder, or metal oxide are also within the scope of these teachings.

Exemplary embodiments of metal oxide micro/nanoparticles are zirconia ($ZrO_2$) and titania ($TiO_2$) micro/nanoparticles (see, for example, these teachings not being limited only to those examples, Structure and properties of fluoroalkylsilane treated nano-titania Chemeca 2011: Engineering a Better World: Sydney Hilton Hotel, NSW, Australia, 18-21 Sep. 2011, and Grafting of $ZrO_2$ powder and $ZrO_2$ membrane by fluoroalkylsilanes, Colloids and Surfaces A: Physicochemical and Engineering Aspects, Volume 243, Issues 1-3, 20 Aug. 2004, Pages 43-47, both of which are incorporated by reference herein in their entirety and for all purposes).

Since the micro/nanoparticles can be modified in order to enhance the affinity for grafting or bonding to the one or more groups in the silane, after modification, a wide number of possibilities of micro/nanoparticles are within the scope of these teachings. The characteristic dimension (such as, for example, a diameter in a substantially spherical particle) of the hierarchical structuring micro/nanoparticles can range from 0.03 micrometers to 5 micrometers or higher, the range of characteristic dimensions being determined by the surface roughness necessary in order to achieve superhydrophobic behavior (see, for example, these teachings not being limited only to that example, Fluorine Based Super Hydrophobic Coatings, Appl. Sci., 2012, 2, 453-464, which is incorporated by reference herein in its entirety and for all purposes). In one instance, the range is preferably from 0.1 µm to 0.3 µm or from 0.05 µm to 0.3 µm.

In one instance, the effective amount of silica micro/nanoparticles is between about 0.5% weight and about 5% weight when dispersed in the liquid silane. In another instance, the effective amount is between about 2% weight and about 5% weight. In yet another instance, the effective amount is between greater than 2% weight and about 5% weight.

In one instance, the other effective amount of synthetic adhesive is between about 10% to about 50% by weight when in a solution with a solvent, such as the solvents disclosed herein above. The other effective amount of synthetic adhesive dissolved in the solvent (or equivalently, the amount of solvent) is selected in order to obtain a layer (film) on the substrate of a desired thickness.

In one instance of the method for assembling the superhydrophobic coating formulation or the method for making an object having a layer resulting from the superhydrophobic coating formulation, at the above described effective and other effective amount concentrations, equal volumes of the two mixtures are mixed to make a final coating mixture. This coating mixture has a ratio of silane coated silica micro/nanoparticles to adhesive to give a cured and dried coating which is superhydrophobic and robust. In other instances of the above referred to methods, the effective amount and the other effective amount correspond to concentrations different from those of the above described instances are mixed in volumes that result in a ratio of silane coated silica micro/nanoparticles and adhesive similar (within 30%, preferably within 10%) to the ratio resulting when equal volumes of the above described mixtures are used.

In one embodiment, curing of the superhydrophobic coating formulation, when coated on a substrate, includes heating for a predetermined time at a predetermined temperature. In one instance, the predetermined time is between about 30 min and about 120 min and the predetermined temperature is between about 65° C. and about 110° C. In another instance, the predetermined temperature is between about 90° C. and about 110° C. In yet another instance, the predetermined temperature is between 65° C. and 80°. In one embodiment, curing includes heating for a predetermined time at a predetermined temperature in the presence of atmospheric humidity, preferably, but not limited to, where the ambient relative humidity is between about 40% to about 60%. In another instance, curing includes remaining at room temperature (RT) for a second predetermined time, where the predetermined time can be up to about 24 hours.

In other embodiments, when radiation curable adhesives are used as the synthetic adhesive, curing includes the application of radiation as necessary to cure the radiation curable polymer. In one instance, the radiation is applied for a predetermined time. In one embodiment of the predetermined time is between about 2 min. to about 4 min.

In one or more embodiments, an object having a superhydrophic, self-cleaning, and icephobic coating of these teachings includes a substrate and a layer disposed on the substrate, the layer resulting from coating with the superhydrophobic coating formulation of these teachings are disclosed herein above. A number of possible embodiments of the object are obtained from the instances and embodiments of the superhydrophobic coating formulation as disclosed herein above. Although exemplary embodiments presented hereinbelow refer to a specific substrate, it should be noted that other substrates, such as, but not limited to, glass, a polymer, a transparent polymer, a polycarbonate, a polymethylmethacryate, a polyethyleneterephtalate, a polyethylenetherftalateglycol, a polysulphone or any modification, combination, copolymer and/or blend thereof a ceramic, a metal, wood, concrete, textiles or leather, are within the scope of these teachings.

FIG. 1 shows a schematic graphical representation of an embodiment of the coated object of these teachings. Referring to FIG. 1, in the embodiment shown there in, a substrate 10 has a layer 20 disposed thereon, the layer resulting from coating with the superhydrophobic coating formulation disclosed herein above.

In one or more embodiments, the method of these teachings for assembling a superhydrophobic coating formulation includes forming a first solution by suspending an effective amount of hierarchical structuring micro/nanoparticles in liquid silane; the liquid silane having one or more groups configured to graft to a hierarchical structuring micro/nanoparticle and at least another group that results in hydrophobicity, stirring the first solution for a first predetermined time, the first predetermined time selected such that the hierarchical structuring micro/nanoparticles react with the liquid silane, forming a second solution by dissolving another effective amount of synthetic adhesive in a solvent; the synthetic adhesive being selected from thermosetting binders (including adhesives), anionic curing adhesives, cationic curing adhesives, free radical curing (including radiation curing) or polymers that form a strong interaction with a surface, and mixing the first solution with the second solution in predetermined proportions.

A number of possible embodiments of the method are obtained from the instances and embodiments of the superhydrophobic coating formulation as disclosed herein above. As stated above, in one instance, the hierarchical structuring micro/nanoparticles are silica nanoparticles or modified silica nanoparticles. A variety of other particles, as stated above, are also within the scope of these teachings. In one instance, the liquid silane includes a fluoroalkyl silane. In other instances, the liquid silane can include alkylsilanes or aminosilanes. In one embodiment, the fluoroalkyl silane is tridecafluorooctyl-triethoxy silane. In one instance, the synthetic adhesive is cyanoacrylate. In one embodiment, the cyanoacrylate is ethyl 2-cyanoacrylate. In one instance, the solvent used with the synthetic adhesive is acetone. Solvents can also include nitromethane, diethyl ether, hexane and chloroform. In one instance, the silica micro/nanoparticles are hydrophobic fumed silica nanoparticles. The silica micro/nanoparticles can also include precipitated silica, unprecipitated silica, hydrophilic fumed silica, colloidal silica or treated colloidal silica. In one embodiment, the silica micro/nanoparticles are surface modified with silicone. In one instance the silicone is polydimethylsiloxane. The silica micro/nanoparticles act as hierarchical structuring micro/nano-structuring agents. Other embodiments of hierarchical structuring micro/nano-structuring agents including, but not limited to, micro/nanoparticles that are surface modified with silicone where, for example, the micro/nanoparticles include treated colloidal silica, silicate, treated silicate, PTFE micropowder, metal nanopowder, or metal oxide, are also within the scope of these teachings. In one instance, the effective amount of silica micro/nanoparticles is between about 0.5% weight and about 5% weight when dispersed in the liquid silane. In another instance, the effective amount is between about 2% weight and about 5% weight. In yet another instance, the effective amount is between greater than 2% weight and about 5% weight. In one instance, the other effective amount of synthetic adhesive is about 50% by weight when in a solution with a solvent, such as the solvents disclosed herein above. In one instance, the first solution is mixed with the second solution in substantially equal portions. The predetermined proportions used in mixing the first solution was second solution are determined by the necessary surface roughness to achieve superhydrophobic behavior and the necessary adhesion of the coating to the surface. As such, the predetermined proportions are dependent on the effective amount of the micro/nanoparticles and the other effective amount of the synthetic adhesive.

Figure 2:
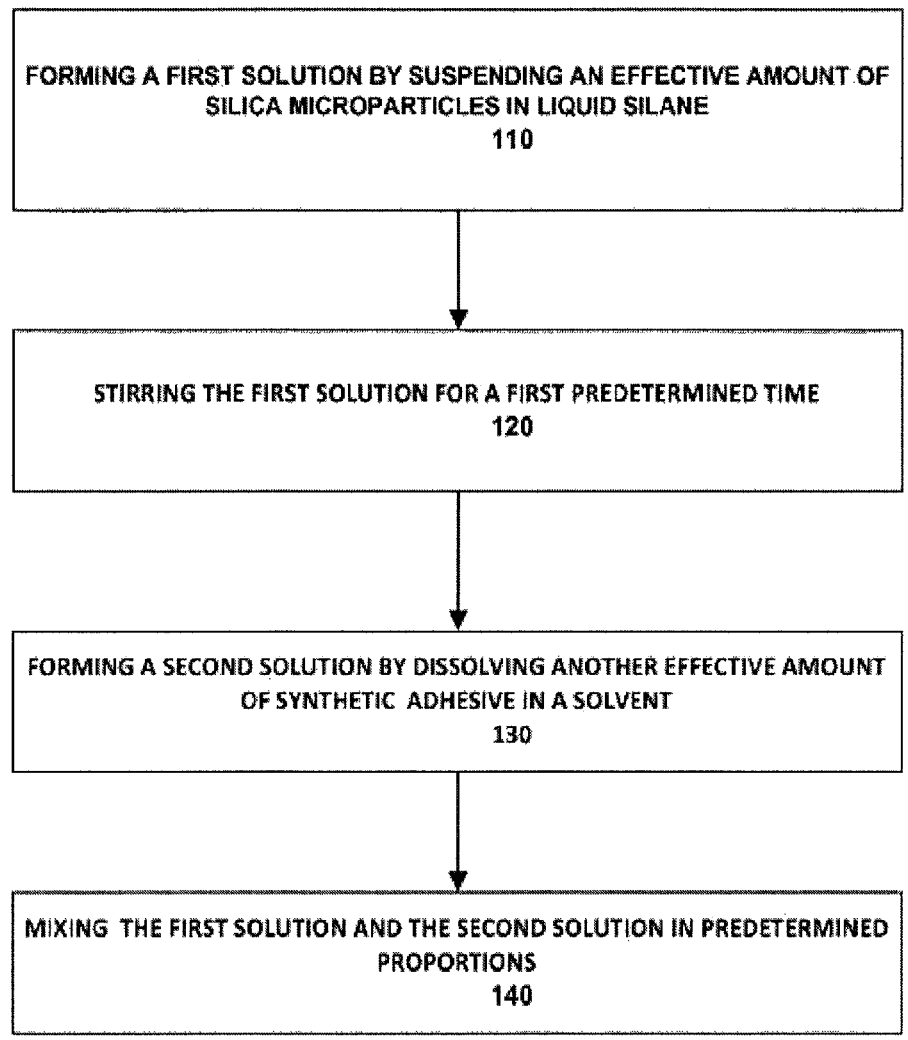
FIG. 2 is a flow diagram representation of one embodiment of the method of these teachings for assembling a superhydrophobic coating formulation.

FIG. 2 is a flow diagram representation of one embodiment of the method of these teachings for assembling a superhydrophobic coating formulation. Referring to FIG. 2 in the embodiment shown there in, a first solution is formed by suspending an effective amount of silica micro/nanoparticles in liquid silane (step 110), the first solution is stirred for a first predetermined time (step 120), a second solution is formed by dissolving another effective amount of synthetic adhesive in a solvent (step 130) and the first solution and the second solution are mixed in predetermined proportions (step 140).

The embodiment of the method of these teachings for assembling a superhydrophobic coating formulation can be assembled in an inert atmosphere.

In another embodiment of method of these teachings for assembling a superhydrophobic coating formulation, the step of mixing the first solution with the second solution in predetermined proportions occurs at a time interval after (and in some cases different place) the forming of the first solution and the forming of the second solution. In one instance, the forming of the first solution and the forming of the second solution occur in an inert atmosphere.

In one embodiment, the coating product of these teachings includes a sealable container, the sealable container including one embodiment of the superhydrophobic coating formulation, where the sealable container is filled in the inert atmosphere. The sealable container, in one instance, can include desiccants and/or acidic surfaces in order to delay or prevent curing of the synthetic adhesives. In another embodiment, the coating product of these teachings includes two sealable containers, one sealable container including one embodiment of the first solution and another sealable container including one embodiment of the second solution. The first solution and the second solution are mixed in predetermined proportions before applying to a substrate.

Figure 4:
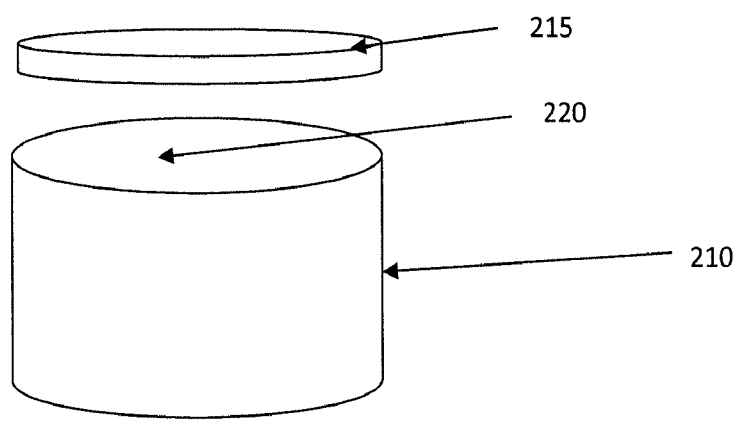
FIG. 4 is a schematic graphical representation of one embodiment of the coating product of these teachings.

FIG. 4 shows one embodiment of the coating product of these teachings. Referring to FIG. 4, in the embodiment shown therein, a container 210 has a sealable cover 215 and the inside 220 is filled with one embodiment of the superhydrophobic coating formulation of these teachings. In other embodiments, the coating product of these teachings includes two containers 210, one filled with one embodiment of the first solution and another one filled with one embodiment of the second solution. Each container is sealed with one sealable cover 215.

In one or more embodiments, the method of these teachings for obtaining a superhydrophobic durable coating includes forming a first solution by suspending an effective amount of hierarchical structuring micro/nanoparticles in liquid silane; the liquid silane having one or more groups configured to graft to a hierarchical structuring micro/nanoparticle and at least another group that results in hydrophobicity, stirring the first solution for a first predetermined time, the first predetermined time selected such that the hierarchical structuring micro/nanoparticles react with the liquid silane, forming a second solution by dissolving another effective amount of synthetic adhesive in a solvent; the synthetic adhesive being selected from thermosetting binders (including adhesives), anionic curing adhesives, cationic curing adhesives, free radical curing (including radiation curing) adhesives or polymers that form a strong interaction with a surface, mixing the first solution with the second solution in predetermined proportions; resulting in a third solution, coating a substrate with the third solution, allowing evaporation of excess solvent in the third solution coated on the substrate, and curing the third solution coated on the substrate by heating for a second predetermined time at a predetermined temperature. In those embodiments, the first four steps assemble the superhydrophobic coating formulation, resulting in the third solution, which is coated on the substrate and cured.

A number of possible embodiments of the method are obtained from the instances and embodiments of the superhydrophobic coating formulation as disclosed herein above. As stated above, in one instance, the hierarchical structuring micro/nanoparticles are silica nanoparticles or modified silica nanoparticles. A variety of other particles, as stated above, are also within the scope of these teachings. In one instance, the liquid silane includes a fluoroalkyl silane. In other instances, the liquid silane can include alkylsilanes and aminosilanes. In one embodiment, the fluoroalkyl silane is tridecafluorooctyl-triethoxy silane.

In one instance, the synthetic adhesive is cyanoacrylate. In one embodiment, the cyanoacrylate is ethyl 2-cyanoacrylate. In one instance, the solvent used with the synthetic adhesive is acetone. Solvents can also include nitromethane, diethyl ether, hexane and chloroform. In one instance, the silica micro/nanoparticles are hydrophobic fumed silica nanoparticles. The silica micro/nanoparticles can also include a precipitated silica, unprecipitated silica, hydrophilic fumed silica, colloidal silica or treated colloidal silica. In one embodiment, the silica micro/nanoparticles are surface modified with silicone. In one instance the silicone is polydimethylsiloxane. In one instance, the effective amount of silica micro/nanoparticles is between about 0.5% weight and about 5% weight when dispersed in the liquid silane. In another instance, the effective amount is between about 2% weight and about 5% weight. In yet another instance, the effective amount is between greater than 2% weight and about 5% weight. In one instance, the other effective amount of synthetic adhesive is about 50% by weight when in a solution with a solvent, such as the solvents disclosed herein above. In one instance, the first solution is mixed with the second solution in substantially equal portions. The predetermined proportions used in mixing the first solution was second solution are determined by the necessary surface roughness to achieve superhydrophobic behavior and the necessary adhesion of the coating to the surface. As such, the predetermined proportions are dependent on the effective amount of the micro/nanoparticles and the other effective amount of the synthetic adhesive.

Figure 3:
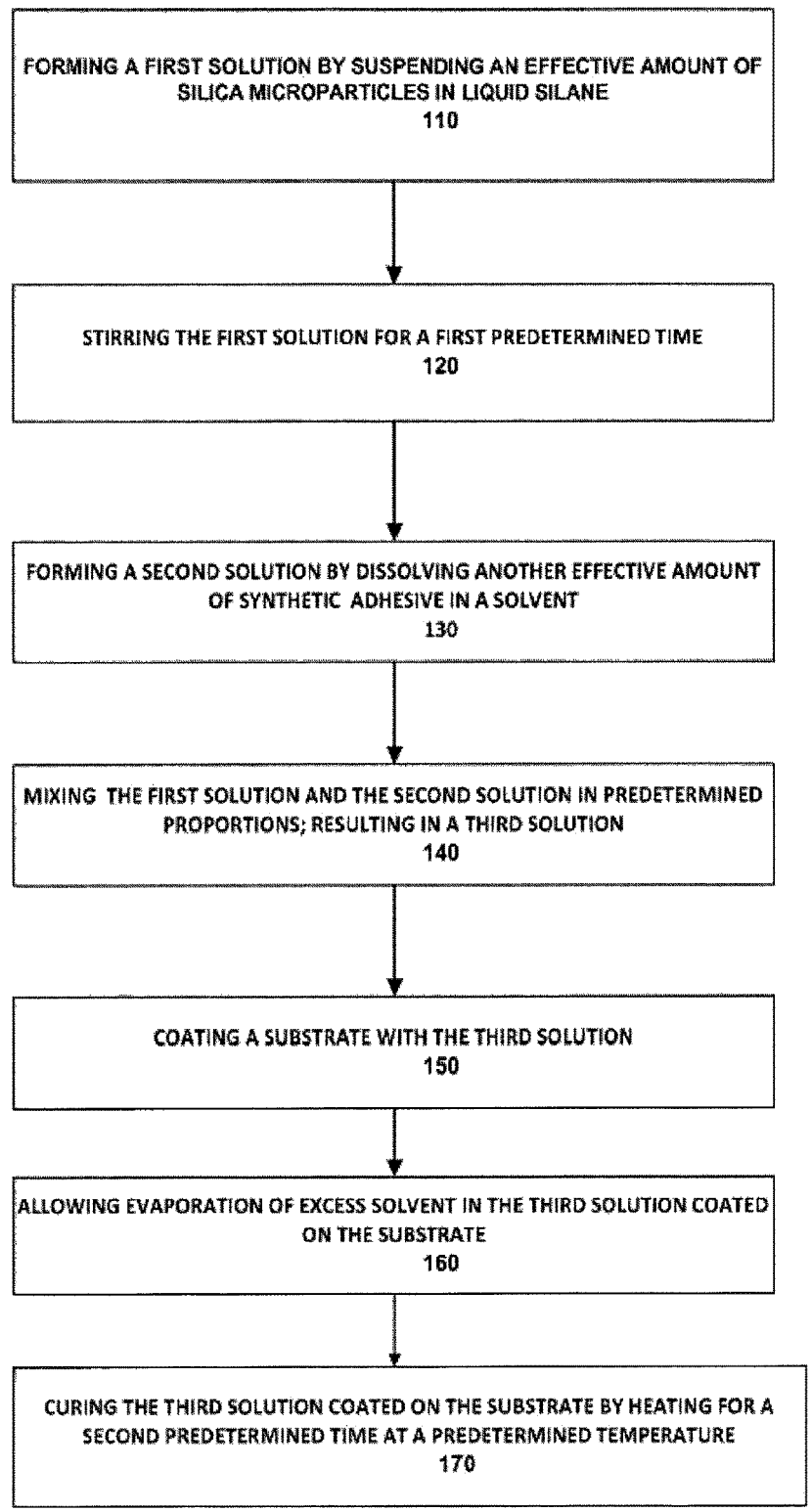
FIG. 3 is a flow diagram representation of one embodiment of the method of these teachings for obtaining a superhydrophobic durable coating.

FIG. 3 is a flow diagram representation of one embodiment of the method of these teachings for obtaining a superhydrophobic durable coating. Referring to FIG. 3, in the embodiment shown therein, the first four steps correspond to assembling of the superhydrophobic coating formulation, shown in FIG. 2, resulting in a third solution. A substrate is coated with the third solution (step 150), the excess solvent in the third solution coated on the substrate is evaporated (step 160) and the coating is then cured by heating for a second predetermined time at a predetermined temperature ((step 170).

Coating can be obtained by a variety of methods, ranging from, but not limited to, dip coating to spin coating, spraying or painting. In one embodiment, curing of the superhydrophobic coating formulation, when coated on a substrate, comprises heating for a predetermined time at a predetermined temperature (the predetermined temperature including room temperature). In one instance, the predetermined time is between about 30 min and about 75 min and the predetermined temperature is between about 65° C. and about 110° C. In another instance, the predetermined temperature is between about 90° C. and about 110° C. In one instance, the heating for the predetermined time at the predetermined temperature occurs under atmospheric humidity, preferably, but not limited to, where the ambient relative humidity is between about 40% to about 60%.

In order to elucidate these teachings, an exemplary embodiment is presented herein below. It should be noted that these teachings are not limited only to that exemplary embodiment.

For the exemplary embodiment, Hydrophobic fumed silica based on alkyl surface treatment, CAB-O-SIL TS720, was supplied by the Cabot Corporation (Boston, Mass.). The silica nanoparticles are found in aggregated form, with aggregate length of 0.2-0.3 microns. A triethoxy(3,3,4,4,5,5,6,6,7,7,8,8,8-tridecafluorooctyl)silane in isopropanol solution, Dynasylan F 8263, was supplied by Evonik Degussa International AG (Essen, Germany). Ethyl 2-cyanoacrylate was supplied in the form of Loctite Super Glue Liquid by Henkel (Rocky Hill, Conn.). Reagent grade acetone was purchased from Sigma Aldrich and used as received. Studies were conducted on two different substrates, polycarbonate and glass. The polycarbonate sheet and borosilicate glass microscope slides were acquired from McMaster-Carr. The polycarbonate sheet had a thickness of 30 mils, and samples were cut to approximately 2.54×2.54 cm. The glass slides were a width of 2.2 cm, but not used as acquired. The slides were scribed, roughly 2.54 cm long, using a diamond scribe then broken where scribed.

Each substrate was cleaned with rinsing with isopropyl alcohol (IPA) and kim-wipes, and then dried with compressed argon gas to reduce the residual moisture on the substrate prior to coating. Two solutions were independently prepared—solution A was a 4% by weight Cabosil TS720 silica in the Dynasylan F8263 silane solution, while solution B was a 50% by weight ethyl 2-cyanoacrylate in acetone solution. Solution A was stirred using a magnetic stirrer for 1 h, which allowed the silica and silane to react. Sonication was used during the initial preparation methodology, however, its use was discontinued after further coating development found it an unnecessary step. Once the solutions have mixed, equal parts by volume of solution A and B were mixed for 5 minutes using a magnetic stirrer just prior to coating. Since the ethyl 2-cyanoacrylate component cures via anionic polymerization in the presence of water, solutions were immediately used after preparation.

The coating methodology varied from substrate dip coating to spin coating though other methods such as painting or spraying could be used. (It should be noted that using the coating in circumstances in which there are already in place substrates in the environment would use an application method such as painting or spraying) Spin coating showed increased visual coating uniformity. Spin coating displayed a highly, repeatable coating thickness and was the method used. The solution contains a large amount of the solvents. These solvents are dissipated at a higher rate, but once the spin coating was completed, the substrates were covered with an inverted glass petri dish that was tilted to allow for evaporation of the residual. After a half an hour of evaporation in one instance (and immediately after in another instance), the sample was placed in a 110° C. oven for 1 h to cure the silane. A curing kinetics study was conducted to determine this to be the better curing method of the methods explored. Two milliliters of the final solution was spin coated using a CHEMAT Technology KW-4A spin coater on glass substrate for 1 min at 4500 rpm. First set of samples was cured in a vacuum (6 mmHg) for 15, 30, 45, and 60 min. Second set was cured in a vacuum (6 mmHg) for 60 min and then heated in an oven for 1 hour at 110° C. Third set was cured in an oven for 1 hour at 110° C. Fourth set was cured at room temperature for 24 hours. All samples were conditioned at room temperature (RT) before characterization. The procedure included the silane cures by removing hydrogen bonding with heat. The heat removes hydrogen bonding in the form of $H_2O$.

Immediately after curing, the goniometer was used to confirm the coating's superhydrophobic property. After confirming the static contact angle and sliding angle correlated to superhydrophobicity, topographical imaging and durability testing were conducted. Topographical imaging was conducted using a JEOL JSM 6390 Field Emission Scanning Electron Microscope (SEM) and a Park PSIA XE-150 Atomic Force Microscope (AFM). The durability testing was evaluated by ASTM D3359-09 Measuring Adhesion by Tape Testing (a visual coating adhesion test that can be enhanced by measuring the transmission of light through the tape before and after the test).

Figure 5:
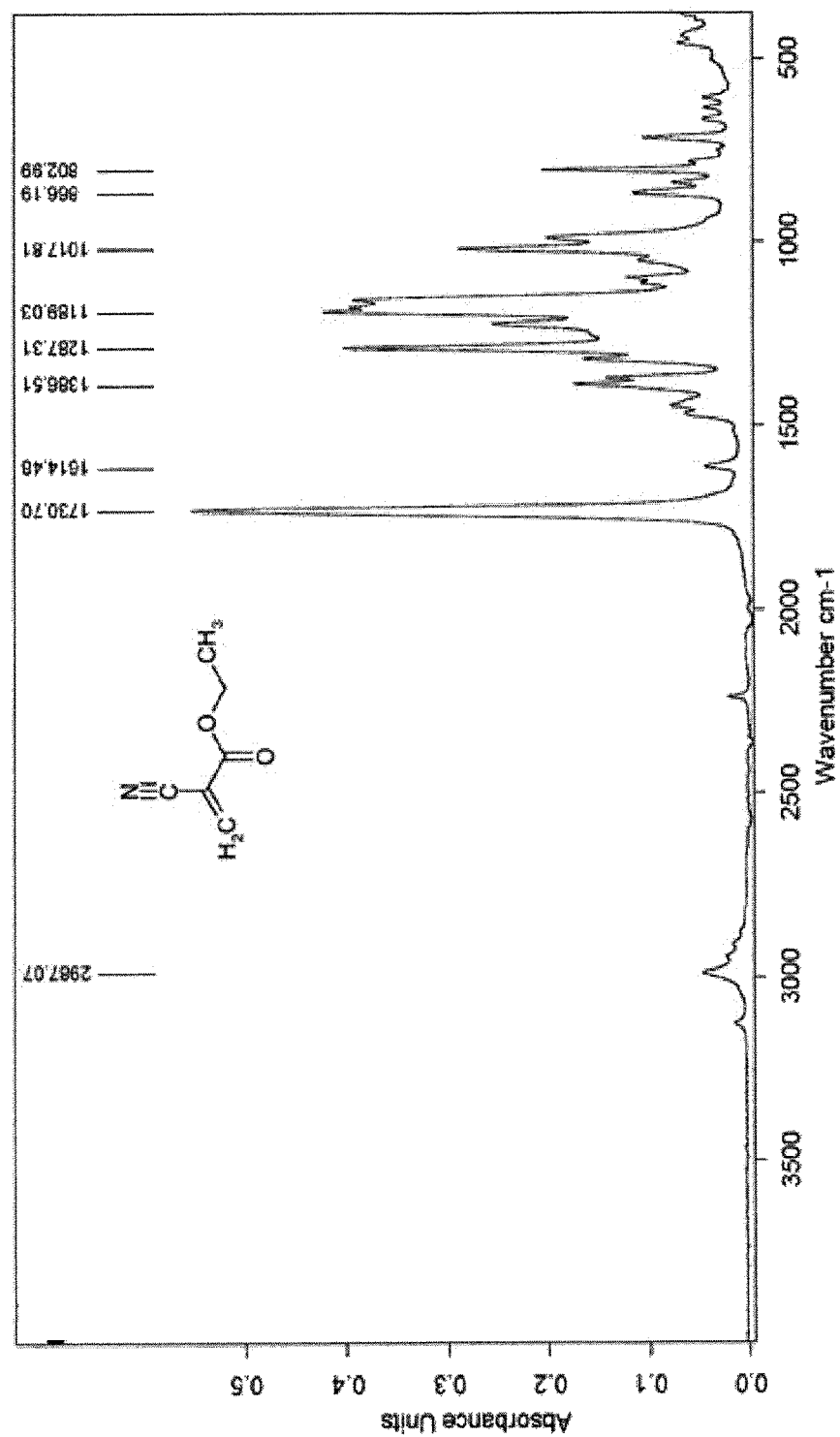
FIG. 5 shows ATR absorption spectrum of a synthetic adhesive used in one embodiment of the formulation of these teachings.
Figure 6:
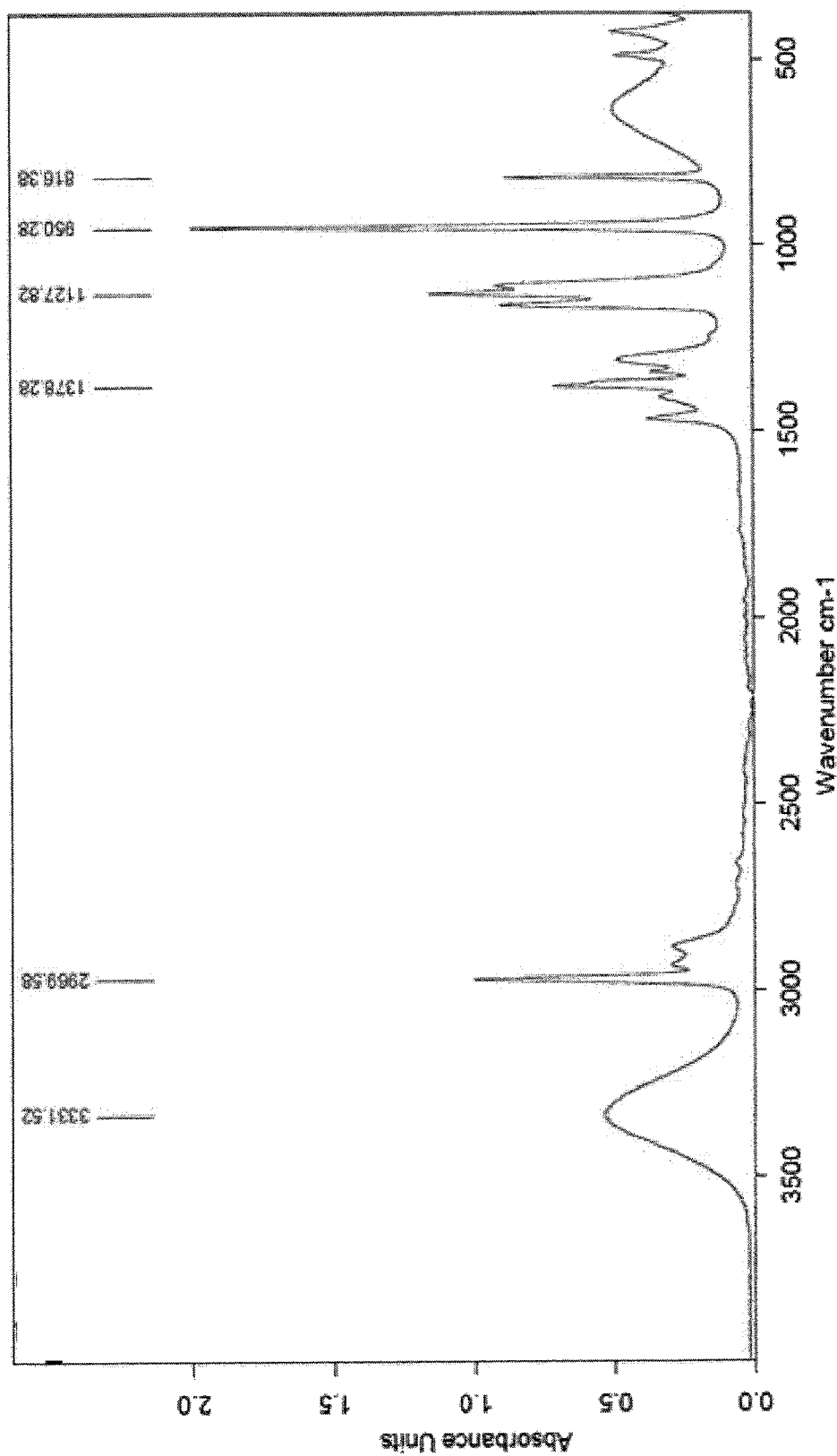
FIG. 6 shows ATR absorption spectrum of a silane used in one embodiment of the formulation of these teachings.
Figure 7:
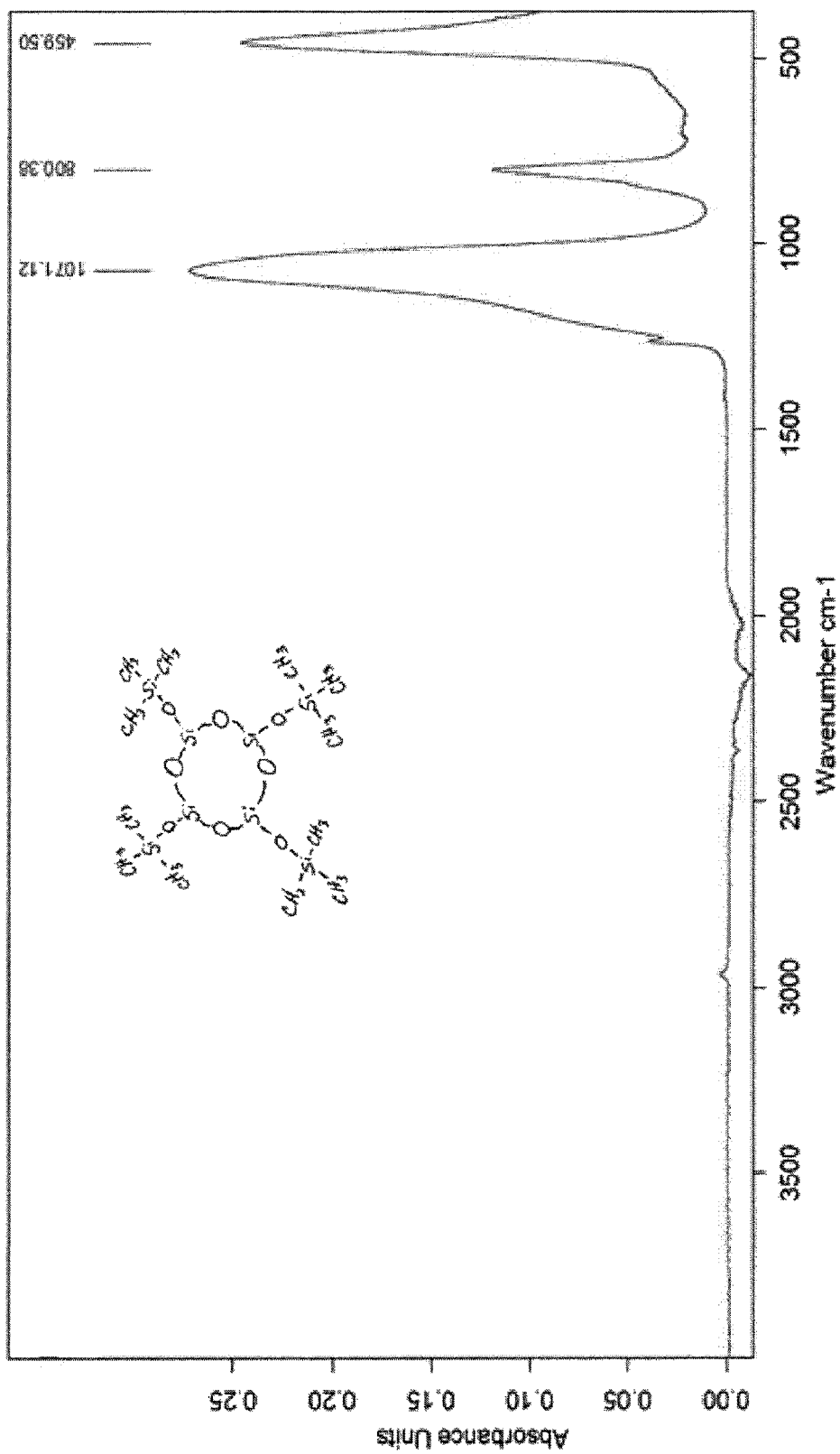
FIG. 7 shows ATR absorption spectrum of silica nanoparticles used in one embodiment of the formulation of these teachings.

The curing behavior of the coating is important to obtaining a durable and superhydrophobic coating. The coating was scanned by Attenuated Total Reflectance (IR). FIG. 5 shows characteristic absorption bands of ethyl 2-cyanoacrylate arising from stretching of ester C=O, alkene C=C, nitrile C≡N and alkyl C—H at 1730, 1614, 2250, and 2987 $cm^{-1}$, respectively. Fluoroalkylsilane shows characteristic absorption bands for Si—O—$CH_2$—$CH_3$, hydrogen bonded Si—OH, Si—O—$(CH_2)_x$—$(CF_2)_x$, and Si—O bond from Si—OH and Si—O—Si at 950 and 1127, 3331, 1150, 816 and 540 $cm^{-1}$ respectively (FIG. 6). Ultrahydrophobic silica, Cabot TS720, exhibited characteristic absorption bands of symmetric and asymmetric Si—O stretch, Si—$CH_3$ and alkyl C—H at 800 and 1071, 1261, and 2980 $cm^{-1}$, respectively (FIG. 7). In order to understand the reaction mechanism, ATR absorption spectra of the three individual components and the combination were characterized.

Figure 8:
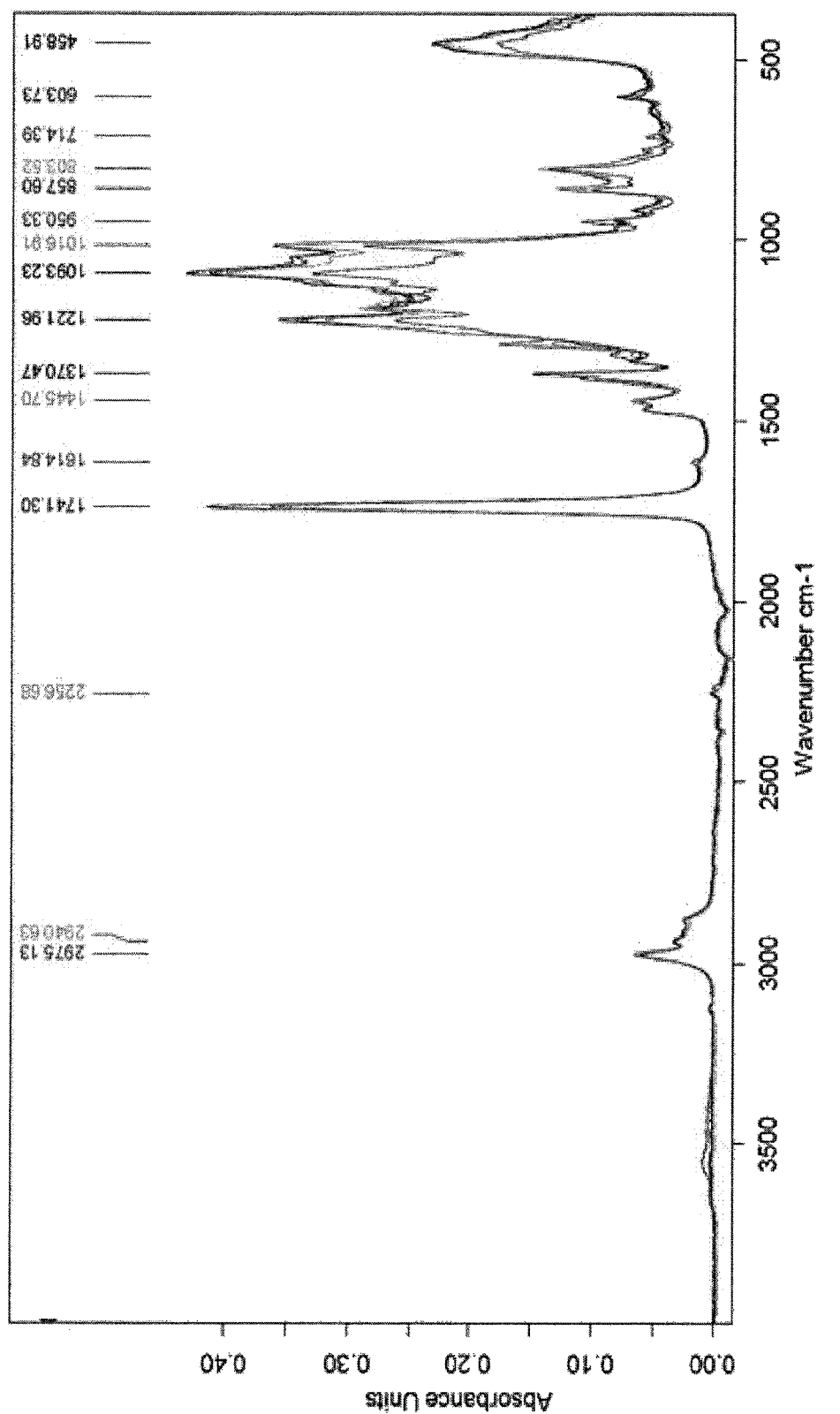
FIG. 8 shows ATR absorption spectrum of one embodiment of a coating of the formulation of these teachings after different vacuum curing conditions.

Illustrated in FIG. 8, all sets were cured under vacuum at varying times, and similar absorption peaks shown for all time periods. In the figure, a low reduction in C=C absorption peak and an increase in Si—O absorption peaks result in polymerization.

Figure 9:
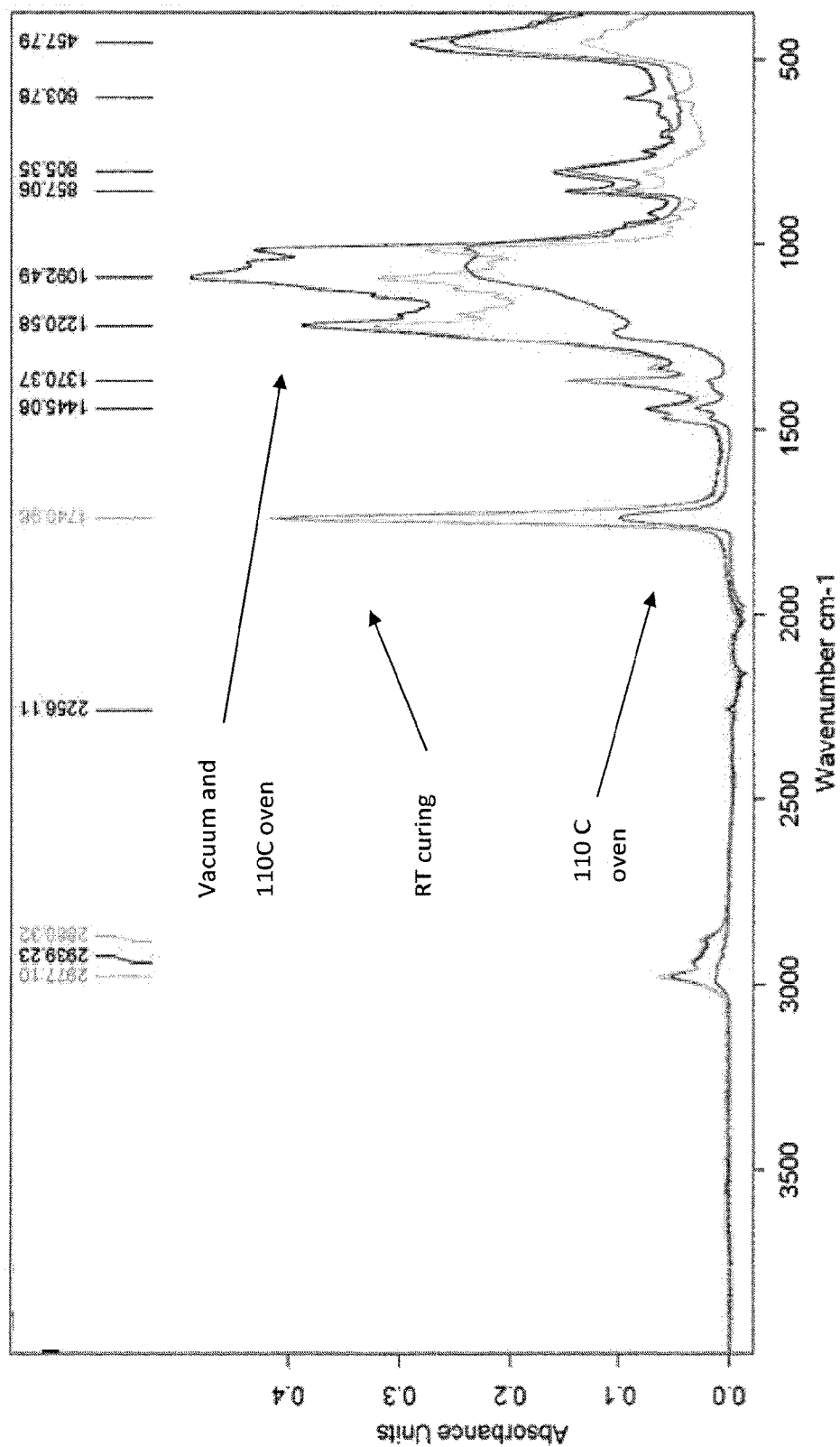
FIG. 9 shows ATR absorption spectrum of one embodiment of a coating of the formulation of these teachings after different heat curing conditions.

FIG. 8 showed no significant change in the curing characteristics of the coating. FIG. 9 demonstrated the absorption peaks for three different curing methods. It can be clearly seen in all sets that the C=C absorption peak at 1614 $cm^{-1}$ from ethyl 2-cyanoacrylate disappeared indicating full curing. On the contrary, it was found, in FIG. 9, that changes in the absorption spectrum in Set 3 compared to Set 2 and 4 derive from elimination of nitrile C≡N and reduction in C=O intensity peaks. This may be due to the ethyl 2-cyanoacrylate curing mechanism, which is as follows: Ethyl 2-cyanoacrylate adhesives contain an acidic stabilizer, which prevent the molecules from polymerization. As the reaction starts, ambient humidity in the air and on the bonding surface neutralized the stabilizer and react with the C=C bond through anionic polymerization. As can be seen, the C=C absorption peak disappeared in all spectra, and confirmed the polymerization mechanism. However, at high temperatures and acidic environment the nitrile group is hydrolyzed to carboxylic acid and at the β position readily undergoes thermal decarboxylation releasing $CO_2$. This is confirmed by the spectra of FIG. 9, Set 3.

Contact angle measurements conform to the ATR results (Table 1). All samples that were cured under vacuum and room temperature (RT) exhibited hydrophilic contact angles (CA<90°) and high sliding angles (SA>90°). This is attributed to the presence of high polar nitrile groups in ethyl 2-cyanoacrylate. However, 60 minute curing in vacuum and high temperature increased significantly contact angle and hydrophobic surface were obtained (CA>90° and SA<10°) due to partial hydrolysis of the polar nitrile group. Better results (CA>150° and SA<10°) were obtained for high temperature curing under atmospheric humidity, which allows complete nitrile hydrolysis and decarboxylation. The curing characteristics are important for obtaining materials with low sliding angle.

TABLE 1

Effect of Curing Conditions on the Contact and Sliding Angles

| Sample | Contact angle (°) | Sliding angle (°) |
|---|---|---|
| 15 min Vacuum | 65-70 | >90 |
| 30 min Vacuum | 67-70 | >90 |
| 45 min Vacuum | 70-75 | >90 |
| 60 min Vacuum | 70-75 | >90 |
| 60 min Vacuum + Heat | 145-150 | 50 |
| Heat | >150 | 0 |
| RT Curing | 70-75 | >90 |

The Tape test for durability is a visual classification according to percent of coating removed. The conventional UH2 coating had a ASTM 3359-09 Classification of 1B (area of coating removed is 35-65%), and the coating described in this exemplary embodiment (i.e., in Table 1, the Sample marked Heat, in which the curing occurs in the open atmosphere exposed to humidity) had a classification of 4B (area of coating removed is less than 5%). This demonstrates the greater durability of the coating of the present teachings.

It should be noted that although these teachings are being illustrated by means of an exemplary embodiment, these teachings are not limited to only the exemplary embodiment.

In order to further elucidate these teachings, three groups of exemplary embodiments are presented hereinbelow. In the embodiments presented hereinbelow, different wt % of hydrophobic silica nanoparticles (NPs) were mixed with fluoroalkyl silane (FAS) and stirred for 15 minutes. Different wt % of polymers, acting as synthetic adhesive, were mixed in acetone under nitrogen. Then, the two solutions were mixed by equal weight. 1 ml from the final solution was spin coated on glass substrate for 1 min at 1250 rpm. Each one of the groups of exemplary embodiments has a given curing prescription.

Table 2 below shows a first group of exemplary embodiments in which the synthetic adhesive is Ethyl Cyanocrylate. The formulations of the first group are cured at 110° C. for two hours.

TABLE 2

| Formulation (After mixing) | Ethyl Cyano-acrylate % wt | Acetone % wt | Silica NPs % wt | FAS % wt | Wetting Properties |
|---|---|---|---|---|---|
| 1 | 25 | 25 | 2.5 | 47.5 | Superhydrophobic |
| 2 | 20 | 30 | 2.5 | 47.45 | Superhydrophobic |
| 3 | 20 | 30 | 2 | 48 | Superhydrophobic |
| 4 | 15 | 35 | 2.5 | 47.5 | Superhydrophobic |
| 5 | 15 | 35 | 1.5 | 48.5 | Superhydrophobic |
| 6 | 10 | 40 | 2.5 | 47.5 | Superhydrophobic |
| 7 | 10 | 40 | 1 | 49 | hydrophobic |
| 8 | 5 | 45 | 2.5 | 47.5 | Superhydrophobic |
| 9 | 5 | 45 | 0.5 | 49.5 | hydrophobic |

Superhydrophobic wetting properties are characterized by a contact angle above 150° and sliding below 10°. Hydrophobic wetting properties are characterized by a contact angle above 90° and sliding angle above 100.

Table 3 below shows the second group of exemplary embodiments in which the polymer, synthetic adhesive, is urethane acrylate. The formulations of the second group are cured under a UV lamp for 4 min.

TABLE 3

| Formulation (After mixing) | Urethane Acrylate % wt | Acetone % wt | Silica NPs % wt | FAS % wt | Wetting Properties |
|---|---|---|---|---|---|
| 1 | 25 | 25 | 2.5 | 47.5 | hydrophobic |
| 2 | 20 | 30 | 2.5 | 47.45 | hydrophobic |
| 3 | 20 | 30 | 2 | 48 | hydrophobic |
| 4 | 15 | 35 | 2.5 | 47.5 | hydrophobic |
| 5 | 15 | 35 | 1.5 | 48.5 | hydrophobic |
| 6 | 10 | 40 | 2.5 | 47.5 | superhydrophobic |
| 7 | 10 | 40 | 1 | 49 | hydrophobic |
| 8 | 5 | 45 | 2.5 | 47.5 | superhydrophobic |
| 9 | 5 | 45 | 0.5 | 49.5 | hydrophobic |

In instances in which the adhesive is urethane acrylate, in some embodiments, the adhesive is between 50 to 65% mercapto-ester.

Table 4 below shows the third group of exemplary embodiments in which the polymer, synthetic adhesive, is epoxy. The formulations of the third group are cured at 110° C. for two hours.

TABLE 4

| Formulation (After mixing) | Epoxy % wt | Acetone % wt | Silica NPs % wt | FAS % wt | Wetting Properties |
|---|---|---|---|---|---|
| 1 | 25 | 25 | 2.5 | 47.5 | hydrophobic |
| 2 | 20 | 30 | 2.5 | 47.45 | hydrophobic |
| 3 | 20 | 30 | 2 | 48 | hydrophobic |
| 4 | 15 | 35 | 2.5 | 47.5 | superhydrophobic |
| 5 | 15 | 35 | 1.5 | 48.5 | hydrophobic |
| 6 | 10 | 40 | 2.5 | 47.5 | superhydrophobic |
| 7 | 10 | 40 | 1 | 49 | hydrophobic |
| 8 | 5 | 45 | 2.5 | 47.5 | superhydrophobic |
| 9 | 5 | 45 | 0.5 | 49.5 | hydrophobic |

In instances where the adhesive is epoxy, in some embodiments, epoxy is Part A (60-100% bisphenol A diglycidyl ether resin) and Part B (60-100% trimethylhexane-1,6-diamine) at 20:5 ratio.

In the embodiments disclosed herein below, the superhydrophobic coating disclosed hereinabove are used as a template to create a superhydrophobic surface structure in a secondary polymer substrate. The template can include castable silicones, such as PDMS, but also in other thermoplastic or thermosetting polymers in a roll to roll or stamping process. This process is scalable and provides a method to create large sheets of superhydrophobic material that could be applied to a surface with a layer of adhesive.

The surface morphologies/roughness can be reproduced by templating or nano-imprinting. In the imprinting method, the surface with the desired features is used as a master to prepare a negative replica by resin casting, electroforming, electroplating or photolithography. The negative replica is then pressed onto the soft plastic sheets/polymers to transfer the desired features. In these teachings, superhydrophic surfaces were used as the "master" for the transfer of hierarchal structure, containing both micro and nano roughness, to the plastic sheets. The superhydrophobic surfaces used as the master were prepared on glass surfaces by coating the hereinabove described silica, fluorosilane and polymer systems onto the glass surface. This durable superhydrophobic "master" is then used to prepare a negative replica. In one embodiment, the negative replica is prepared by casting and epoxy resin on it. The negative replica, which inherits durability (in one embodiment, epoxy) is pressed into either a thermoplastic (such as polypropylene (PP); polycarbonate (PC)) or thermosetting or curable polymer to obtain the desired hierarchal structure. The plastic sheet obtained from this imprinting method showed a static contact angle of more than 160° and a sliding angle of less than 10°. The negative replica can be prepared using other materials such as elastomers, metals or waxes. Often used elastomers include polydimethylsiloxane (PDMS) (see, for example, Yeong, H. E., Kwak, M. K., Park, C. I., & Suh, K. Y. (2009). Wettability of nanoengineered dual-roughness surfaces fabricated. *Journal of Colloid and Interface Science*, 202-207, which is incorporated by reference herein in its entirety and for all purposes) and polyurethane acrylate (PUA), the replica from these are prepared using a polymer casting technique. In the polymer casting method liquid resin of PDMS or PUA is cast against the superhydrophobic "master" surface and cured using heat or UV radiation. Then this PDMS or PUA negative is stripped from the master giving the desired negative feature of the master surface. An example of wax used to prepare the negative replica is polyvinylsiloxane dental wax (see, for example, Bhushan, B. (2011). Biomimetics inspired surfaces for drag reduction and oleophobicity/philicity. *Beilstien Journal of Nanotechnology*, 66-88, which is Incorporated by reference herein in its entirety and for all purposes) and these wax negative mold are also prepared by the resin casting method (a polyvinylsiloxane dental wax was applied via a dispenser on the upper side of master and immediately pressed down with a glass plate. After complete hardening of the molding mass (at room temperature 3-5 minutes), the master surface and the mold (negative) were separated). Metals can also be used to prepare the negative replica, for example; nickel, copper, silver and iron. Electroforming (see, for example, Lee, S. M., & Kwon, T. H. (2006). Mass-producible replication of highly hydrophobic surfaces from plant leaves. *Nanotechnology*, 3189-3196, and McGeougha, J. A., Leub, M. C., Rajurkarc, K. P., & K, A. M. (2001). Electroforming Process and Application to Micro/Macro Manufacturing. *CIRP Annals—Manufacturing Technology*, 499-514, both of which are Incorporated by reference herein in their entirety and for all purposes) is widely used technique for the preparation of a metal negative replica, in which thin metal molds are formed through electrodeposition. The mold is produced by coating a conductive layer of a metal onto a base form, known as a mandrel, which is removed after forming. In this work, a superhydrophobic surface with conductive coating is the mandrel and then nickel is deposited on its surface by electrodeposition and later that nickel mold is stripped from the superhydrophobic master.

In one or more embodiments, the method of these teachings for forming super hydrophobic surfaces in polymer structures includes: forming a super hydrophobic layer on a substrate by: forming a first solution by suspending an effective amount of hierarchical structuring micro/nanoparticles in liquid silane; the liquid silane having one or more groups configured to graft to a hierarchical structuring micro/nanoparticle and at least another group that results in hydrophobicity; stirring the first solution for a first predetermined time, the first predetermined time selected such that the hierarchical structuring micro/nanoparticles react with the liquid silane; forming a second solution by dissolving another effective amount of synthetic adhesive in a solvent; the synthetic adhesive being selected from thermosetting binders (including adhesives), anionic curing adhesives, cationic curing adhesives, free radical curing (including radiation curing) adhesives or polymers that form a strong interaction with a surface; mixing the first solution with the second solution in predetermined proportions; resulting in a third solution; coating a substrate with the third solution; and allowing evaporation of excess solvent in the third solution coated on the substrate; and curing the third solution coated on the substrate by heating for a second predetermined time at a predetermined temperature; coating the super hydrophobic layer with a negative replica material, the negative replica material being one of a first thermosetting polymer solution, a casting resin of a heat curable elastomer, a casting resin of a UV curable elastomer or a wax; curing the negative replica material resulting in a cured negative replica material; peeling the cured negative replica material, resulting in a cured negative replica layer; using the cured negative replica layer as a master for forming super hydrophobic surfaces in polymer structures.

In one embodiment, the negative replica material is the first thermosetting polymer solution.

In one instance, the first thermosetting polymer solution includes Polydimethylsiloxane (PDMS). In another instance, the first polymer solution includes Polytetrafluoroethylene (PTFE). In yet another instance, the first polymer solution includes epoxy.

Figure 11:
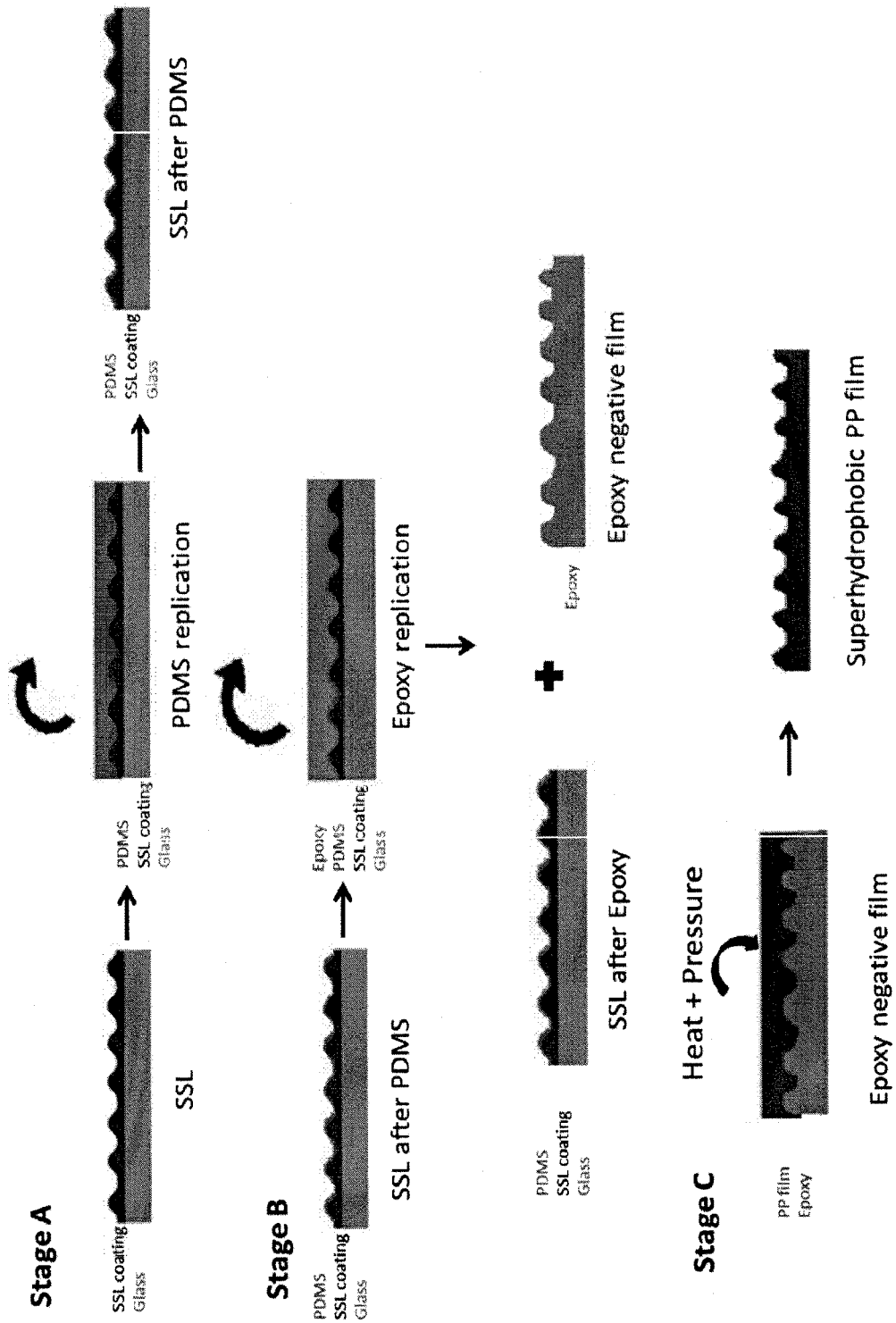
FIG. 11 illustrates an embodiment of the method of these teachings for forming super hydrophobic surfaces in polymer structures r.

In one embodiment, the method of these teachings for forming super hydrophobic surfaces in polymer structures also includes:

(a) coating, after forming the super hydrophobic layer, the super hydrophobic layer with a second thermosetting polymer solution;

(b) curing the second thermosetting polymer solution, resulting in a second cured thermosetting polymer layer; and (c) peeling the second cured thermosetting polymer layer and leaving a thin layer of the second thermosetting polymer disposed on the super hydrophobic layer; steps (a) through (c) being performed before coating the super hydrophobic layer with the first thermosetting polymer solution. FIG. 11 illustrates the above disclosed embodiment.

In one instance, the second thermosetting polymer solution includes PDMS. In another instance, the first thermosetting polymer solution includes polyepoxides.

In one or more other embodiments, the method for forming super hydrophobic surfaces in polymer structures includes forming a super hydrophobic layer on a substrate by:

forming a first solution by suspending an effective amount of hierarchical structuring micro/nanoparticles in liquid silane; the liquid silane having one or more groups configured to graft to a hierarchical structuring micro/nanoparticle and at least another group that results in hydrophobicity; stirring the first solution for a first predetermined time, the first predetermined time selected such that the hierarchical structuring micro/nanoparticles react with the liquid silane; forming a second solution by dissolving another effective amount of synthetic adhesive in a solvent; the synthetic adhesive being selected from thermosetting binders (including adhesives), anionic curing adhesives, cationic curing adhesives, free radical curing (including radiation curing) adhesives or polymers that form a strong interaction with a surface;

mixing the first solution with the second solution in predetermined proportions; resulting in a third solution; coating a substrate with the third solution; and allowing evaporation of excess solvent in the third solution coated on the substrate; and curing the third solution coated on the substrate by heating for a second predetermined time at a predetermined temperature;

depositing a metal on the super hydrophobic layer; peeling the deposited metal, resulting in a deposited metal layer; using the deposited metal layer as a master for forming super hydrophobic surfaces in polymer structures.

Figure 10:
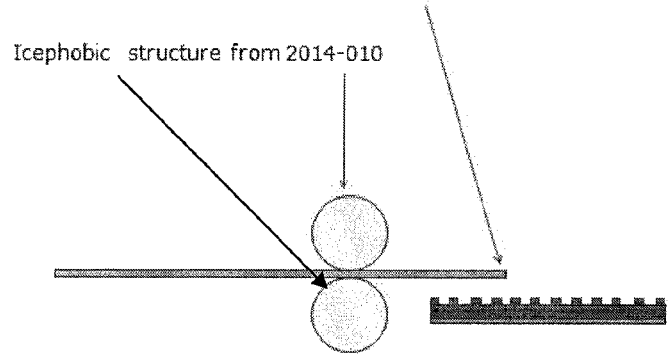
FIG. 10 shows a system used in one embodiment of the method of these teachings.

In one or more embodiments, the method of these teachings for forming super hydrophobic surfaces in polymer structures also includes disposing the first cured thermosetting polymer layer over one roll in a roll-to roll embosser and forming super hydrophobic surfaces on the polymer structure by processing the polymer structures through the roll to roll embosser. FIG. 10 shows a roll to roll embosser as used in these teachings.

In order to further illustrate these teachings, exemplary embodiments are presented hereinbelow. It should be noted that these teachings are not limited only to these exemplary embodiments.

Exemplary Embodiment I

Materials: A two-part room temperature 10:1 elastomer base to curing agent PDMS kit, Sylgard 186, was purchased from Dow Corning (Midland, Mich.).

Casted PDMS (Sylgard 184) at 75° C. for two hours

Sample Preparation Procedure A silicon disk was used as a substrate to reduce likelihood that the surface features resulted from anything but the nanoparticle aggregates and coating. The substrate was cleaned with successive swabs of IPA soaked wipes, and then dried with compressed nitrogen gas. Two solutions were independently prepared—solution A was a 4% by weight Cabosil TS720 silica in the Dynasylan F8263 silane solution, while solution B was a 50% by weight ethyl 2-cyanoacrylate in acetone solution. In one instance, each solution was stirred using a magnetic stirrer for 1 h. Instances where each solution was stirred for 15 mins have also been observed. Sonication was used during the initial preparation methodology, however its use was discontinued after further coating development found it an unnecessary step. Once the solutions have mixed, equal parts by volume of solution A and B were mixed for 5 minutes using a magnetic stirrer just prior to coating. Since the ethyl 2-cyanoacrylate component cures via anionic polymerization in the presence of water, solutions were immediately used after preparation. The coating methodology varied from substrate dip coating, slow and fast evaporation of pooled solution on the substrate through covering and uncovering, to spin coating the substrate. The most visually uniform coating was slow evaporation, which was performed by, in one instance, pipetting 10 mL of the coating onto the center of the silicon. Instances where 1 mL of the coating was pippetted have also been observed. Once the solution was applied, the disk was covered with an inverted glass petri dish that was propped up by 3 mm to allow for the solvent dissipation of the headspace. In one instance, after an hour, the sample was placed in a 100° C. oven for 1 hr. Instances where the sample was placed in the under the 100° C. oven for one hour of also been observed. Ten parts of the elastomer base to one part of the curing agent within the PDMS kit were mixed thoroughly by hand. The mixed material was put into a room temperature vacuum oven, and put under vacuum until the entrapped air was evacuated. The mixture was then poured onto the coated substrate, and placed into a vacuum oven to again evacuate any entrapped air. The complete system was then removed from the vacuum oven and, in one instance, placed into a 100 C oven for 45 minutes, until the PDMS kit was cured. In another instance, the complete system was then removed from the vacuum oven and, in one instance, placed into a 80° C. oven for six hours. The PDMS elastomer stamp was then peeled off the substrate.

This PDMS elastomer stamp (the stamp may be made from other polymers (both thermoplastic or thermosetting such as PTFE or Polyurethance Acrylate rubber may exhibit superhydrophobic characteristics on its own, or it may be used as a master to create a tool to create replicate surfaces in a secondary polymer substrate Exemplary Embodiment II PP Replication Using Epoxy Resin Step 1: First 2 wt % superhydrophobic coating was prepared and spin coated on glass substrate.

Step 2: Then PDMS replication is done on the superhydrophobic coating coated glass surface by using Sylguard 184. First PDMS solution is prepared in 10:1 ratio with base and hardener. Then this thoroughly mixed solution is kept under vacuum to remove the air bubbles for the replication. Then this PDMS solution is poured on top of the superhydrophobic coating coated glass surface and, in one instance, cured at 85° C. under vacuum for 6 hours. (In another instance, the PDMS solution is poured on top of the superhydrophobic coating coated glass surface and cured at 150° C. under vacuum for him 15 min. Then the cured PDMS is carefully peeled from on top of the superhydrophobic coating coated glass surface which leaves very thin layer of PDMS on the superhydrophobic coating coated glass substrate. The surface with a thin layer of PDMS is still superhydrophobic.) Then the cured PDMS is carefully peeled from on top of the superhydrophobic coating coated glass surface which leaves very thin layer of PDMS on the superhydrophobic coating coated glass substrate. The superhydrophobic coating coated glass substrate with a thin layer of PDMS on top after PDMS replication, still shows superhydrophobicity.

Step 3: Then the superhydrophobic coating substrate with a PDMS thin layer on top is used to obtain a negative impression on an epoxy resin. The epoxy resin used here for the imprinting is EPO-TEK 301 (Epoxy Technology). For this negative imprinting, the epoxy solution is prepared in 5:1 ratio with hardener and poured on top of the superhydrophobic coating coated glass substrate after PDMS replication. Then the epoxy is cured on top of the superhydrophobic coating coated glass substrate for 2 hours at 65° C. The cured epoxy is then carefully peeled from the superhydrophobic coating coated glass surface. The average contact angle of replicated epoxy surfaces from the superhydrophobic coating coated substrate is 150° and has an average sliding angle of 15°.

Step 4: Then this epoxy surface is used to get the positive impression on polypropylene films (PP). The procedure for this replication process is—

The compression molding method is adopted for this replication process

First, a small die is heated to the temperature of 190° C.

Then the PP film is put on top of the epoxy surface and a pressure of 0.011 MPa is applied for 30 minutes keeping the temperature at 190° C.

After 30 minutes of heating, the entire die with the PP sample is cooled up to room temperature keeping the sample under load throughout.

Then the PP films are peeled from the epoxy surface.

The PP films obtained from the epoxy imprinting showed superhydrophibicity.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the present teachings have been described with respect to various embodiments, it should be realized these teachings are also capable of a wide variety of further and other embodiments within the spirit and scope of the appended claims.

What is claimed is:

1. A method for reproducing durable super hydrophobic surfaces in polymer structures from a super hydrophobic layer formed on a substrate, the method comprising:
   coating the super hydrophobic layer with a negative replica material, the negative replica material being one of a first thermosetting polymer solution, a casting resin of a heat curable elastomer, a casting resin of a UV curable elastomer or a wax;
   curing the negative replica material resulting in a cured negative replica material;
   peeling the cured negative replica material, resulting in a cured negative replica layer; and
   using the cured negative replica layer as a master for forming super hydrophobic surfaces in polymer structures;
   wherein forming the super hydrophobic layer on the substrate comprises:
   forming a first solution by suspending an effective amount of hierarchical structuring micro/nanoparticles in liquid silane; the structuring micro/nanoparticles comprising silica microparticles; the liquid silane having one or more groups configured to graft to a hierarchical structuring micro/nanoparticle and at least another group that results in hydrophobicity;
   stirring the first solution for a first predetermined time, the first predetermined time selected such that the hierarchical structuring micro/nanoparticles react with the liquid silane;
   forming a second solution by dissolving another effective amount of synthetic adhesive in a solvent; the synthetic adhesive being a thermosetting adhesive;
   mixing the first solution with the second solution in predetermined proportions; resulting in a third solution;
   coating a substrate with the third solution;
   allowing evaporation of excess solvent in the third solution coated on the substrate; and
   curing the third solution coated on the substrate by heating for a second predetermined time at a predetermined temperature; wherein the second predetermined time is between 30 min and 75 min and wherein the predetermined temperature is between 80° C. and 110° C.;
   wherein, upon curing, the layer is configured to have has a contact angle greater than 150° and a sliding angle of less than 10° and is configured such that less than 5% of an area of the layer is removed in a Tape test performed according to ASTM D3359.

2. The method of claim 1 wherein the cured negative replica material is the first thermosetting polymer solution.

3. The method of claim 2 wherein the first thermosetting polymer solution comprises PDMS.

4. The method of claim 2 wherein the first polymer solution comprises PTFE.

5. The method of claim 2 wherein the first polymer solution comprises epoxy.

6. The method of claim 2 further comprising:
   (a) coating, after forming the super hydrophobic layer, the super hydrophobic layer with a second thermosetting polymer solution;
   (b) curing the second thermosetting polymer solution, resulting in a second cured thermosetting polymer layer; and
   (c) peeling the second cured thermosetting polymer layer and leaving a thin layer of the second thermosetting polymer disposed on the super hydrophobic layer; steps (a) through (c) being performed before coating the super hydrophobic layer with the first thermosetting polymer solution.

7. The method of claim 6 wherein the second thermosetting polymer solution comprises PDMS.

8. The method of claim 5 wherein the first thermosetting polymer solution comprises polyepoxides.

9. The method of claim 1 wherein the negative replica material is a casting resin of a heat curable elastomer or a casting resin of a UV curable elastomer.

10. The method of claim 9 wherein the heat curable or UV curable elastomer is polydimethylsiloxane (PDMS).

11. The method of claim 9 wherein the heat curable or UV curable elastomer is polyurethane acrylate (PUA).

12. The method of claim 1 wherein the negative replica material is a polyvinylsiloxane wax.

13. The method of claim 1 further comprising:
   disposing the cured negative replica layer over one roll in a roll-to roll embosser; and
   forming super hydrophobic surfaces on the polymer structure by processing the polymer structures through the roll to roll embosser.

14. The method of claim 6 further comprising:
   disposing the first pure thermosetting polymer layer over one roll in a roll-to roll embosser; and
   forming super hydrophobic surfaces on the polymer structure by processing the polymer structures through the roll to roll embosser.

15. The method of claim 1 wherein said one or more groups comprise one or more tri-ethoxy groups.

16. The method of claim 15 wherein the liquid silane comprises a fluoroalkyl silane.

17. The method of claim 16 wherein the liquid silane comprises tridecafluorooctyl-triethoxy silane.

18. The method of claim 1 wherein the synthetic adhesive is cyanoacrylate.

19. The method of claim 18 wherein the cyanoacrylate is ethyl 2-cyanoacrylate.

20. The method of claim 1 wherein the solvent is acetone.

21. The method of claim 1 wherein the silica micro/nanoparticles are hydrophobic fumed silica nanoparticles.

22. The method of claim 1 wherein said effective amount is between 0.5% weight and about 5% weight when being dispersed in the liquid silane.

23. The method of claim 1 wherein the effective amount is between 2% weight and about 4% weight when being dispersed in the liquid silane; and wherein said another effective amount is about 50% weight when in solution with the solvent and said solvent is acetone.

24. The method of claim 1 wherein the effective amount is between greater than 2% weight and about 4% weight when being dispersed in the liquid silane; and wherein said another effective amount is about 50% weight when in solution with the solvent and said solvent is acetone.

25. The method of claim 1 wherein the predetermined proportions comprises substantially equal parts of the first solution and the second solution.

\* \* \* \* \*